(12) United States Patent
Choi et al.

(10) Patent No.: US 9,504,116 B2
(45) Date of Patent: Nov. 22, 2016

(54) AIR CONDITIONING SYSTEM CONTROLLER FOR MOTOR VEHICLES

(71) Applicant: Halla Visteon Climate Control Corp., Daejeon (KR)

(72) Inventors: Ei Hyun Choi, Daejeon (KR); Hae Sok Jeong, Daejeon (KR)

(73) Assignee: Hanon Systems, Daejeon-si (KR)

( * ) Notice: Subject to any disclaimer, the term of this patent is extended or adjusted under 35 U.S.C. 154(b) by 35 days.

(21) Appl. No.: 14/573,028

(22) Filed: Dec. 17, 2014

(65) Prior Publication Data

US 2015/0165966 A1 Jun. 18, 2015

(30) Foreign Application Priority Data

| Dec. 17, 2013 | (KR) | 10-2013-0156907 |
| Aug. 22, 2014 | (KR) | 10-2014-0109733 |
| Aug. 22, 2014 | (KR) | 10-2014-0109745 |
| Aug. 22, 2014 | (KR) | 10-2014-0109755 |

(51) Int. Cl.
| H05B 33/08 | (2006.01) |
| B60Q 1/12 | (2006.01) |
| B60H 1/00 | (2006.01) |
| F21V 23/02 | (2006.01) |

(52) U.S. Cl.
CPC ...... *H05B 33/0872* (2013.01); *B60H 1/00642* (2013.01); *B60Q 1/122* (2013.01); *F21V 23/02* (2013.01)

(58) Field of Classification Search
USPC .................................................. 315/76–84
See application file for complete search history.

(56) References Cited

U.S. PATENT DOCUMENTS

| 2003/0142504 A1* | 7/2003 | Mueller | B60H 1/00985 362/488 |
| 2007/0046452 A1* | 3/2007 | Anderson | B60H 1/00985 340/449 |
| 2009/0292528 A1* | 11/2009 | Kameyama | G08G 1/0962 704/9 |

* cited by examiner

*Primary Examiner* — Tuyet Vo
(74) *Attorney, Agent, or Firm* — Fraser Clemens; Martin & Miller LLC; James D. Miller

(57) ABSTRACT

An air conditioning system controller for motor vehicles includes a mood lamp, an illumination device configured to illuminate the mood lamp with a variable illumination color, and a control unit configured to control the illumination device to change the illumination color of the illumination device depending on a cooling/heating load.

17 Claims, 12 Drawing Sheets

AIR CONDITIONING SYSTEM CONTROLLER FOR MOTOR VEHICLES

CROSS-REFERENCE TO RELATED APPLICATION

This application claims priority to Korean Patent Application No. 10-2013-0156907, filed on Dec. 17, 2013, Korean Patent Application No. 10-2014-0109733 filed on Aug. 22, 2014, Korean Patent Application No. 10-2014-0109745 filed on Aug. 22, 2014, and Korean Patent Application No. 10-2014-0109755 filed on Aug. 22, 2014, the disclosures of which are incorporated herein by reference in their entirety.

FIELD OF THE INVENTION

The present invention relates to an air conditioning system controller for motor vehicles and, more particularly, to an air conditioning system controller for motor vehicles which can differently change an illumination color of an illumination device for illuminating a switch symbol, a display unit, a mood lamp and the like in view of different factors such as a cooling/heating load, an external air temperature and the like, thereby differently changing a vehicle interior design depending on the driving situation and driving environment of a motor vehicle.

BACKGROUND OF THE INVENTION

A motor vehicle is provided with a controller for controlling an air conditioning system. The controller is installed in a front panel existing in front of a driver's seat. As shown in FIG. 1, the controller includes a housing 1, a plurality of switches 3, a plurality of mood lamps 4 and a display unit 5, the latter three of which are installed in the housing 1.

The switches 3 include rotary switches and button switches which are operated by a user to turn on or off the corresponding units or to adjust setting values of the corresponding units.

In general, each of the switches 3 includes a symbol 3a and an indicator 3b. The symbol 3a and the indicator 3b are caused to emit light by an illumination device (not shown), thereby indicating the on/off state of each of the switches 3 and enhancing the nighttime visibility thereof.

The mood lamps 4 include a ring-type mood lamp 4-1 installed around a rotary switch 3-1 and a bar-type mood lamp 4-2 installed in the front surface portion of the housing 1. The ring-type mood lamp 4-1 includes a mood ring 4a installed around the rotary switch 3-1 and an illumination device configured to illuminate the mood ring 4a. The illumination device includes a plurality of light sources 4b, e.g., light-emitting diodes, disposed at a regular interval along the rear surface of the mood ring 4a. The light sources 4b emit light as electric power is applied thereto. The emitted light is irradiated on the rear surface of the mood ring 4a. Thus, the mood ring 4a can emit light and can illuminate the periphery of the rotary switch 3-1.

The bar-type mood lamp 4-2 includes a mood bar 4c installed in the front surface portion of the housing 1 and an illumination device configured to illuminate the mood bar 4c. The illumination device includes a plurality of light sources 4d, e.g., light-emitting diodes, disposed at a regular interval along the rear surface of the mood bar 4c. The light sources 4d emit light as electric power is applied thereto. The emitted light is irradiated on the rear surface of the mood bar 4c. Thus, the mood bar 4c can emit light and can illuminate the front surface of the housing 1.

The display unit 5 is configured to display the operating state of the air conditioning system and so forth. If a setting value is inputted by operating each of the switches 3, the display unit 5 displays the data corresponding to the setting value. Furthermore, the display unit 5 displays the indoor temperature, the indoor humidity, the air discharge direction, and so forth.

The display unit 5 is provided with an illumination device (not shown). The display unit 5 includes a plurality of light sources (not shown) installed on the rear surface of the display unit 5 and configured to illuminate the display unit 5. Thus, the display unit 5 is illuminated at specified brightness. This helps enhance the visibility of the display unit 5.

In recent years, it is necessary that the function and configuration of the air conditioning system and the color of the controller be improved in conformity with the trend of improvement of a motor vehicle. In particular, vehicle users believe it important to improve the vehicle interior design. For that reason, it is required to improve the design, color, and illumination of the controller, thereby improving the vehicle interior design. However, the conventional air conditioning system controller fails to comply with such requirements.

SUMMARY OF THE INVENTION

In view of the above circumstances, it is an object of the present invention to provide an air conditioning system controller for motor vehicles capable of differently changing the illumination color of the controller.

Another object of the present invention is to provide an air conditioning system controller for motor vehicles capable of improving a vehicle interior design by differently changing the illumination color of the controller.

A further object of the present invention is to provide an air conditioning system controller for motor vehicles capable of significantly enhancing the marketability of the motor vehicle by improving the vehicle interior design.

According to one aspect of the present invention, there is provided an air conditioning system controller for motor vehicles, including: a mood lamp; an illumination device configured to illuminate the mood lamp with a variable illumination color; and a control unit configured to control the illumination device to change the illumination color of the illumination device depending on a cooling/heating load.

The air conditioning system controller may further include: a blower rotation speed level detecting unit configured to detect the cooling/heating load by detecting a blower rotation speed level which varies with the cooling/heating load. The control unit may be configured to change the illumination color of the illumination device depending on the blower rotation speed level detected by the blower rotation speed level detecting unit.

The air conditioning system controller may further include: an external air temperature condition detecting unit configured to detect whether an external air temperature condition is a cooling condition, a heating condition or a cooling/heating mixed condition. The control unit may be configured to change the illumination color of the illumination device depending on one of the cooling condition, the heating condition and the cooling/heating mixed condition detected by the external air temperature condition detecting unit and the blower rotation speed level detected by the blower rotation speed level detecting unit.

In the air conditioning system controller, the control unit may be configured to: under the cooling condition, control the illumination color of the illumination device so as to become a white color, when the blower rotation speed level detected by the blower rotation speed level detecting unit is a lowest level, and so as to become a cold color whose chroma gradually increases as the blower rotation speed level grows higher, when the blower rotation speed level detected by the blower rotation speed level detecting unit is higher than the lowest level; under the heating condition, control the illumination color of the illumination device so as to become a white color, when the blower rotation speed level detected by the blower rotation speed level detecting unit is the lowest level, and so as to become a warm color whose chroma gradually increases as the blower rotation speed level grows higher, when the blower rotation speed level detected by the blower rotation speed level detecting unit is higher than the lowest level; and under the cooling/heating mixed condition, control the illumination color of the illumination device so as to become a white color regardless of the blower rotation speed level detected by the blower rotation speed level detecting unit.

In the air conditioning system controller, the illumination device may include a plurality of light sources disposed along a rear surface of the mood lamp at a predetermined interval, and the control unit may be configured to individually control light emission colors of the light sources depending on the cooling/heating load such that colors of different regions of the mood lamp are independently changed depending on the cooling/heating load.

In the air conditioning system controller, the control unit may be configured to: under the cooling condition, control the light emission colors of the light sources so as to become a white color, when the blower rotation speed level detected by the blower rotation speed level detecting unit is equal to or lower than a predetermined reference blower rotation speed level, and so as to become a blue-based color having different chromas, when the blower rotation speed level detected by the blower rotation speed level detecting unit is higher than the reference blower rotation speed level; under the heating condition, control the light emission colors of the light sources so as to become a white color, when the blower rotation speed level detected by the blower rotation speed level detecting unit is equal to or lower than the predetermined reference blower rotation speed level, and so as to become a yellow-based color having different chromas, when the blower rotation speed level detected by the blower rotation speed level detecting unit is higher than the reference blower rotation speed level; and under the cooling/heating mixed condition, control the light emission colors of the light sources so as to become a white color regardless of the blower rotation speed level detected by the blower rotation speed level detecting unit.

The air conditioning system controller according to the present invention has a configuration capable of differently changing the illumination colors of various kinds of illumination devices depending on the cooling/heating load. It is therefore possible to provide an effect of improving the vehicle room atmosphere and the vehicle interior design.

Furthermore, the air conditioning system controller according to the present invention has a configuration capable of differently changing the illumination colors of the illumination devices depending on the cooling/heating load and in view of the external air temperature. This makes it possible to finely divide the illumination color changing factors. It is therefore possible to provide an effect of differently changing the illumination colors of the illumination device depending on the driving situation and driving environment of a motor vehicle.

Since the air conditioning system controller according to the present invention is capable of differently changing the illumination colors of the illumination device depending on the driving situation and driving environment of a motor vehicle, it is possible to provide an effect of further improving the vehicle room atmosphere and the vehicle interior design.

Furthermore, the air conditioning system controller according to the present invention has a configuration capable of differently changing the illumination colors of the illumination devices depending on the cooling/heating load and capable of differently controlling the illumination colors of different regions of the illumination devices in case where the cooling/heating load is large. This makes it possible to greatly improve the vehicle room illumination. It is possible to provide an effect of significantly enhancing the marketability of a motor vehicle.

Furthermore, the air conditioning system controller according to the present invention has a configuration capable of differently controlling the illumination colors of different regions of the illumination devices in case where the cooling/heating load is large. It is therefore possible to provide an effect of enabling a user to recognize that the vehicle room is being rapidly cooled or heated at the present time.

Moreover, the air conditioning system controller according to the present invention has a configuration capable of restraining the change of the illumination colors of the illumination devices if such a need arises. It is therefore possible to provide an effect of cancelling the change of the illumination colors of the illumination devices in case where a user does not wish to change the illumination colors.

Since the air conditioning system controller according to the present invention is capable of cancelling the change of the illumination colors of the illumination devices in case where a user does not wish to change the illumination colors, it is possible to provide an effect of relieving the shortcomings attributable to the change of the illumination colors, e.g., the visual stimulus given to a driver and the resultant hindrance of safe driving.

BRIEF DESCRIPTION OF THE DRAWINGS

The above and other objects and features of the present invention will become apparent from the following description of preferred embodiments, given in conjunction with the accompanying drawings. The patent or application file contains at least one drawing executed in color. Copies of this patent or patent application publication with color drawings will be provided by the Office upon request and payment of the necessary fee.

DETAILED DESCRIPTION OF EXEMPLARY EMBODIMENTS OF THE INVENTION

Certain preferred embodiments of an air conditioning system controller for motor vehicles according to the present invention will now be described in detail with reference to the accompanying drawings. The following detailed description and appended drawings describe and illustrate various exemplary embodiments of the invention. The description and drawings serve to enable one skilled in the art to make and use the invention, and are not intended to limit the scope of the invention in any manner. Throughout the drawings, components identical with those of the conventional air conditioning system controller described earlier will be designated by like reference symbols.

[First Embodiment]

Figure 1:
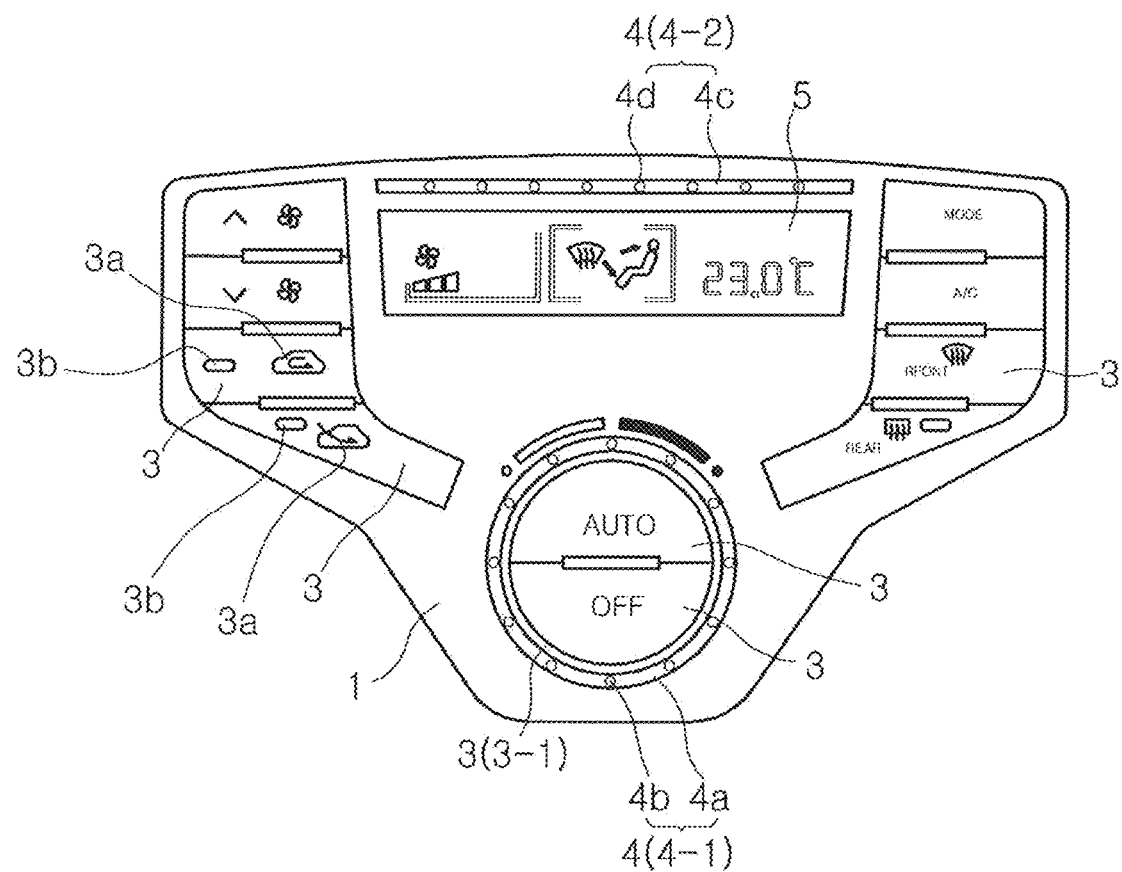
FIG. 1 is a view showing a conventional air conditioning system controller for motor vehicles.

First, the general configuration of an air conditioning system controller for motor vehicles according to the present invention will be briefly described with reference to FIGS. 1 and 3.

The air conditioning system controller includes a housing 1, a plurality of switches 3, a plurality of mood lamps 4 and a display unit 5, the latter three of which are installed in the housing 1.

The switches 3 are operated by a user to turn on or off the corresponding units or to adjust setting values of the corresponding units. Each of the switches 3 includes a symbol 3a and an indicator 3b. The symbol 3a and the indicator 3b are caused to emit light by an illumination device (not shown).

The mood lamps 4 include a ring-type mood lamp 4-1 installed around a rotary switch 3-1 and a bar-type mood lamp 4-2 installed in a front surface portion of the housing 1. The ring-type mood lamp 4-1 includes a mood ring 4a installed around the rotary switch 3-1 and an illumination device configured to illuminate the mood ring 4a. The illumination device includes a plurality of light sources 4b disposed at a regular interval along a rear surface of the mood ring 4a. The light sources 4b emit light as electric power is applied thereto. The emitted light is irradiated on the rear surface of the mood ring 4a.

The bar-type mood lamp 4-2 includes a mood bar 4c installed in the front surface portion of the housing 1 and an illumination device is configured to illuminate the mood bar 4c. The illumination device includes a plurality of light sources 4d disposed at a regular interval along a rear surface of the mood bar 4c. The light sources 4d emit light as electric power is applied thereto. The emitted light is irradiated on the rear surface of the mood bar 4c.

Figure 2:
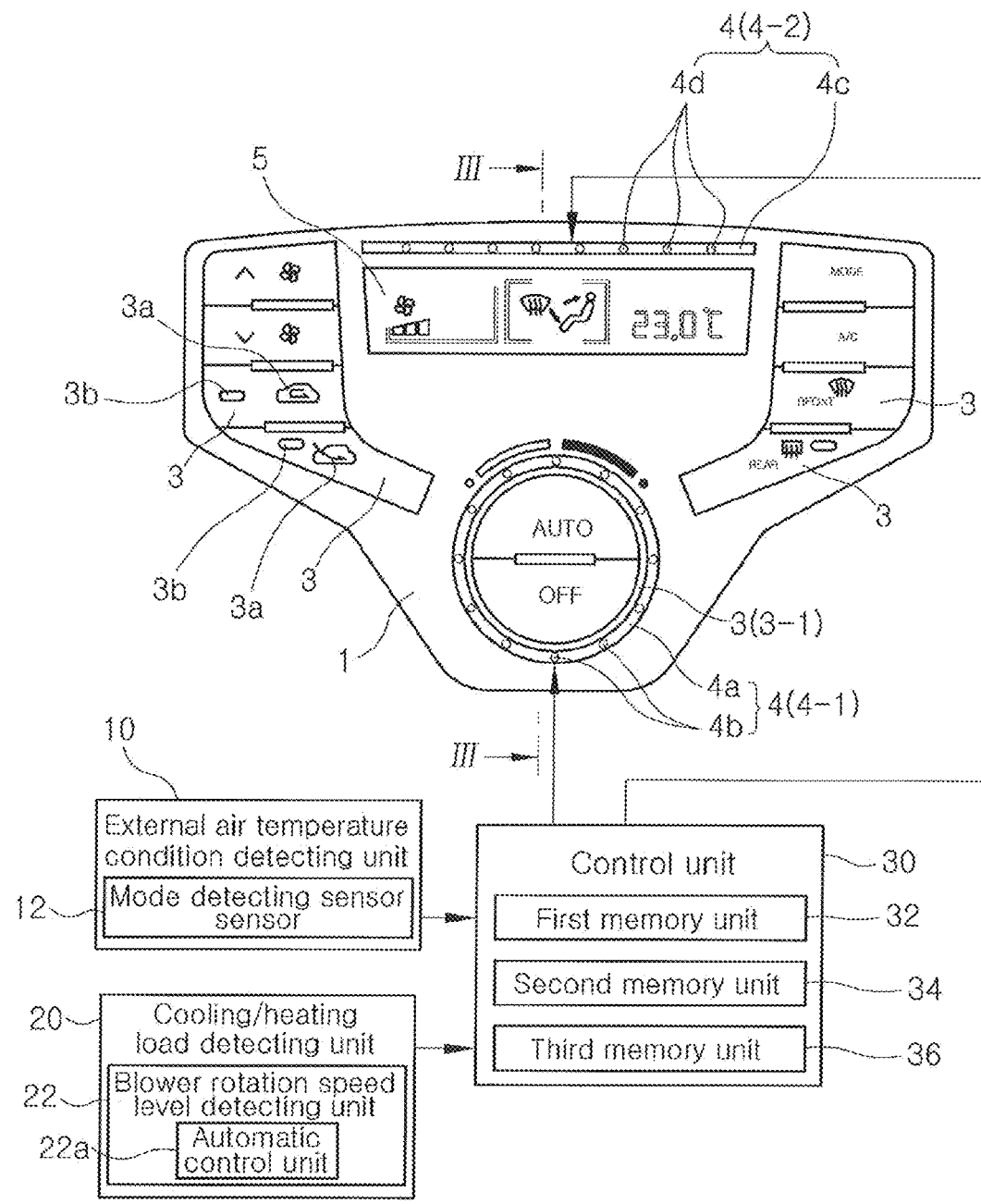
FIG. 2 is a view showing an air conditioning system controller for motor vehicles according to a first embodiment of the present invention.

As shown in FIG. 2, the display unit 5 is configured to display the operating state of the air conditioning system and so forth. The display unit 5 is illuminated at specified brightness by a light source (not shown).

Next, certain features of the air conditioning system controller according to the present invention will be described in detail with reference to FIGS. 2 to 6.

Figure 3:
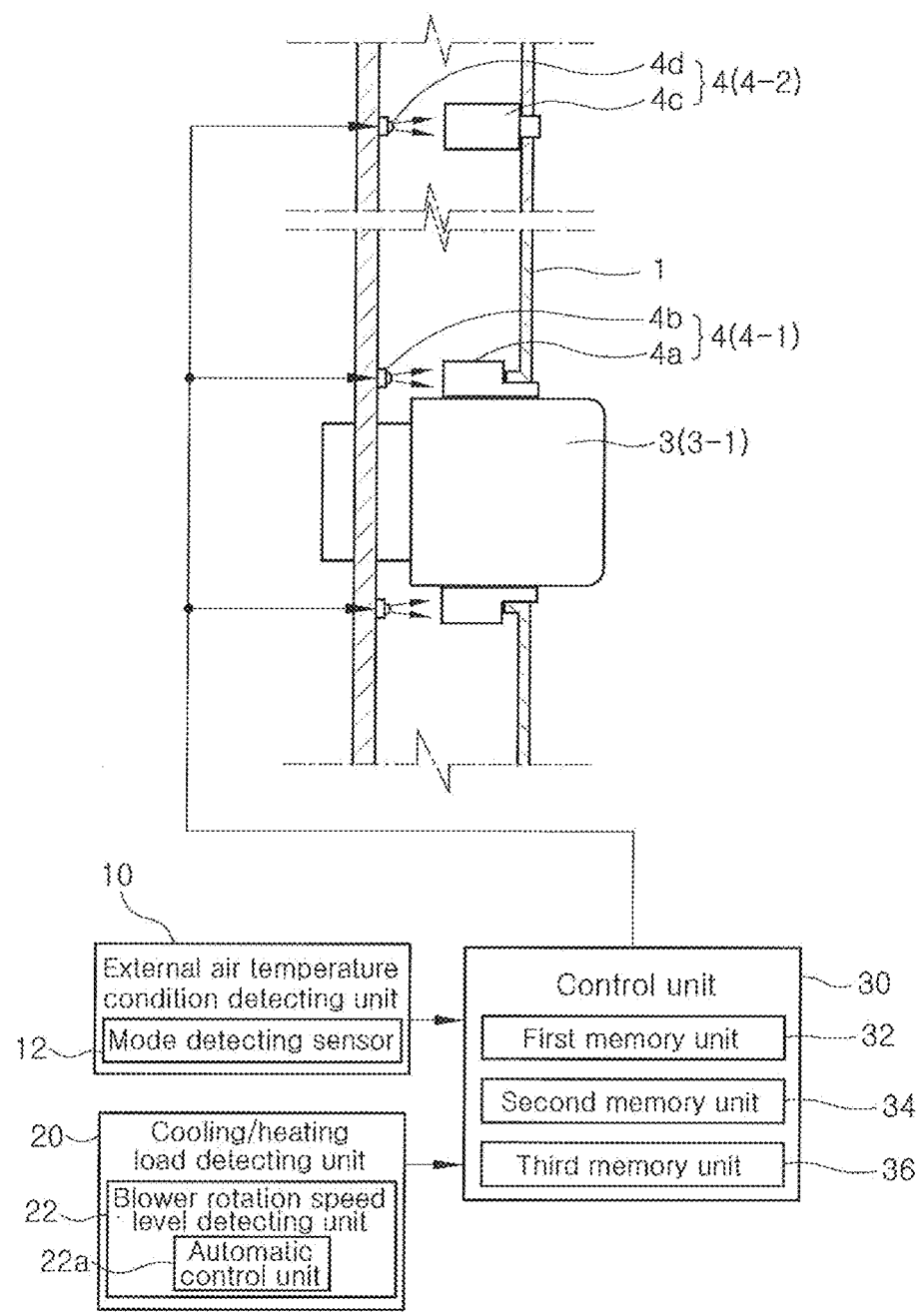
FIG. 3 is a sectional view taken along line in FIG. 3.

Referring first to FIGS. 2 and 3, the air conditioning system controller according to the present invention includes light sources 4d of an illumination device (Light sources 4d of a bar-type mood lamp 4-2 will be described by way of example). Each of the light sources 4d of the illumination device is formed of LEDs of three RGB colors. The light sources 4d of the illumination device irradiate light of different colors to the mood bar 4b. Thus, the mood lamp 4 can be illuminated in different colors.

The air conditioning system controller includes an external air temperature condition detecting unit 10 for detecting whether an external air temperature condition is a condition for execution of a cooling operation, or a condition for execution of a heating operation, or a condition for execution of a cooling/heating mixed operation.

The external air temperature condition detecting unit 10 includes a mode detecting sensor 12 for detecting an air discharge mode. The mode detecting sensor 12 is a sensor for detecting the air discharge mode of an air conditioning system which varies depending on the external air temperature. The mode detecting sensor 12 serves to indirectly detect a current external air temperature condition by detecting a current air discharge mode.

More specifically, the air conditioning system controls the air discharge operation in a vent mode under a cooling condition usually available in summer. The air conditioning system controls the air discharge operation in a floor mode under a heating condition usually available in winter. The air conditioning system controls the air discharge operation in a mode other than the vent mode and the floor mode, e.g., a bi-level mode or a mixed mode, under a cooling/heating mixed condition usually available in spring and autumn.

Accordingly, by detecting the air discharge mode of the air conditioning system with the mode detecting sensor 12, it is possible to detect whether the current external air temperature condition is the cooling condition, or the heating condition, or the cooling/heating mixed condition.

The air conditioning system controller further includes a cooling/heating load detecting unit 20. The cooling/heating load detecting unit 20 includes a blower rotation speed level detecting unit 22. The blower rotation speed level detecting unit 22 is configured to indirectly detect a cooling/heating load of the air conditioning system by detecting a current rotation speed level of a blower. The blower rotation speed level detecting unit 22 is provided with an automatic control unit 22a for automatically controlling the blower.

The automatic control unit 22a is configured to find a cooling/heating load based on vehicle indoor/outdoor temperatures and a user setting temperature, calculate an optimal blower rotation speed level value based on the cooling/heating load thus found, and automatically control a rotation speed level of the blower (not shown) based on the blower rotation speed level value thus calculated. The automatic control unit 22a enables the blower rotation speed level detecting unit 22 to detect the blower rotation speed level based on the blower rotation speed level signal output by the automatic control unit 22a and enables the cooling/heating load detecting unit 20 to detect the cooling/heating load based on the blower rotation speed level detected by the blower rotation speed level detecting unit 22.

The automatic control unit 22a includes a microprocessor and a driving circuit. The automatic control unit 22a is well-known in the art and therefore will not be described in detail.

The cooling/heating load detecting unit 20 may include a temperature adjusting switch 3-1. The temperature adjusting switch 3-1 is a switch for setting a vehicle indoor temperature (hereinafter referred to as a "vehicle indoor setting temperature"). If a specified cooling/heating level is selected by operating the temperature adjusting switch 3-1, the cooling/heating load detecting unit 20 can indirectly detect the cooling/heating load of the air conditioning system based on the selected cooling/heating level.

The vehicle indoor setting temperature serves as a factor which decides the cooling/heating load. Accordingly, if a specified cooling/heating level is selected by the temperature adjusting switch 3-1, the cooling/heating load detecting unit 20 can detect the cooling/heating load of the air conditioning system based on the selected cooling/heating level.

Referring again to FIGS. 2 and 3, the air conditioning system controller according to the present invention includes a control unit 30 which includes a microprocessor. If the cooling/heating load is inputted from the cooling/heating load detecting unit 20, namely if the blower rotation speed level is inputted from the blower rotation speed level detecting unit 22 or if the vehicle indoor setting temperature is inputted from the temperature adjusting switch 3-1, the control unit 30 controls the light sources 4d of the mood lamps 4 depending on the blower rotation speed level or the vehicle indoor setting temperature, thereby changing the light emission colors of the mood lamps 4 (Hereinafter, description will be made on an example where the light emission colors of the mood lamps 4 are changed depending on the blower rotation speed level).

The light emission colors of the mood lamps 4 are changed depending on the cooling/heating load, namely the blower rotation speed level. In this regard, the control unit 30 stores, in advance, illumination colors associated with the cooling/heating loads, namely illumination colors associated with the blower rotation speed levels (Hereinafter, the cooling/heating load will be often referred to as a "blower rotation speed level").

If a specific blower rotation speed level is inputted from the blower rotation speed level detecting unit 22, the control unit 30 detects an illumination color corresponding to the specific blower rotation speed level thus inputted. Based on the illumination color thus detected, the control unit 30 controls the illumination devices, i.e., the light sources 4d of the mood lamps 4 and consequently adjusts the light emission color of the mood lamps 4.

The control unit 30 includes a first memory unit 32, a second memory unit 34, and a third memory unit 36. The first memory unit 32 stores different cooling-condition illumination colors associated with the blower rotation speed levels under the cooling condition of the vehicle room. The second memory unit 34 stores different heating-condition illumination colors associated with the blower rotation speed levels under the heating condition of the vehicle room. The third memory unit 36 stores different cooling/heating-mixed-condition illumination colors associated with the blower rotation speed levels under the cooling/heating mixed condition of the vehicle room.

If the external air temperature condition detecting unit 10 detects whether the current external air temperature condition is the cooling condition, or the heating condition, or the cooling/heating mixed condition, the control unit 30 checks the memory unit corresponding to the detected condition, detects the illumination color associated with the blower rotation speed level from the checked memory unit, and controls the light sources 4d of the mood lamp 4 based on the detected illumination color.

For example, if the external air temperature condition detecting unit 10 detects that the current external air temperature condition is the cooling condition, the control unit 30 detects the cooling-condition illumination colors associated with the blower rotation speed levels from the first memory unit 32 and controls the light sources 4d of the mood lamp 4 based on the detected cooling-condition illumination colors.

Specifically, the control unit 30 detects the illumination color corresponding to the blower rotation speed level input by the blower rotation speed level detecting unit 22 from the cooling-condition illumination colors stored in the first memory unit 32 and then controls the light emission color of the light sources 4d in conformity with the cooling-condition illumination color thus detected.

Thus, the light emission color of the mood lamp 4 can be differently changed under the cooling condition depending on the blower rotation speed level. As a result, the light emission color of the mood lamp 4 can be differently changed depending on the cooling load.

If the external air temperature condition detecting unit 10 detects that the current external air temperature condition is the heating condition, the control unit 30 detects the heating-condition illumination colors associated with the blower rotation speed levels from the second memory unit 34 and controls the light sources 4d of the mood lamp 4 based on the detected heating-condition illumination colors.

Specifically, the control unit 30 detects the illumination color corresponding to the blower rotation speed level input by the blower rotation speed level detecting unit 22 from the heating-condition illumination colors stored in the second memory unit 34 and then controls the light emission color of the light sources 4d in conformity with the illumination color thus detected.

Thus, the light emission color of the mood lamp 4 can be differently changed under the heating condition depending on the blower rotation speed level. As a result, the light emission color of the mood lamp 4 can be differently changed depending on the heating load.

If the external air temperature condition detecting unit 10 detects that the current external air temperature condition is the cooling/heating mixed condition, the control unit 30 detects the cooling/heating-mixed-condition illumination colors associated with the blower rotation speed levels from the third memory unit 36 and controls the light sources 4d of the mood lamp 4 based on the detected cooling/heating-mixed-condition illumination colors.

Specifically, the control unit 30 detects the illumination color corresponding to the blower rotation speed level input by the blower rotation speed level detecting unit 22 from the cooling/heating-mixed-condition illumination colors stored in the third memory unit 36 and then controls the light emission color of the light sources 4d in conformity with the illumination color thus detected.

Thus, the light emission color of the mood lamp 4 can be differently changed under the cooling/heating mixed condition depending on the blower rotation speed level. As a result, the light emission color of the mood lamp 4 can be differently changed depending on the cooling/heating load.

The illumination colors associated with the blower rotation speed levels are stored at different values in the first memory unit 32, the second memory unit 34, and the third memory unit 36.

Figure 4:
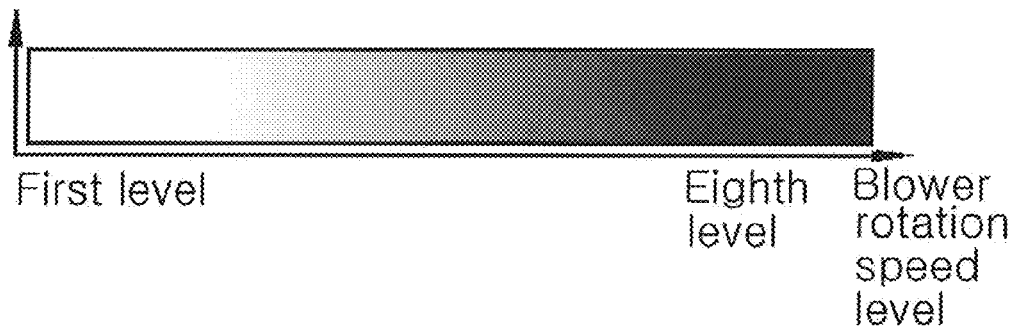
FIG. 4 is a view showing an operation example of the air conditioning system controller according to the first embodiment, in which view there is shown a color change chart which indicates a change of an illumination color of an illumination device depending on the blower rotation speed level under a cooling condition.

Preferably, as shown in FIG. 4, the cooling-condition illumination colors associated with the blower rotation speed levels, which are stored in the first memory unit 32, are set so as to become darker cold colors as the blower rotation speed level grows higher.

More preferably, the cooling-condition illumination colors stored in the first memory unit 32 are set such that the cooling-condition illumination color corresponding to the lowest blower rotation speed level becomes an achromatic color, e.g., a white color. The remaining cooling-condition illumination colors are set so as to become cold colors, e.g., blue-based colors, whose chroma gradually increases as the blower rotation speed level grows higher.

The reason for employing the above configuration is to make sure that the cooling-condition illumination colors associated with the blower rotation speed levels, which are stored in the first memory unit 32, are set to become blue-based cold colors in conformity with the cooling condition. This makes it possible to control the cooling-condition illumination color of the mood lamp 4 so as to become blue-based cold colors in a corresponding relationship with the cooling condition.

Figure 5:
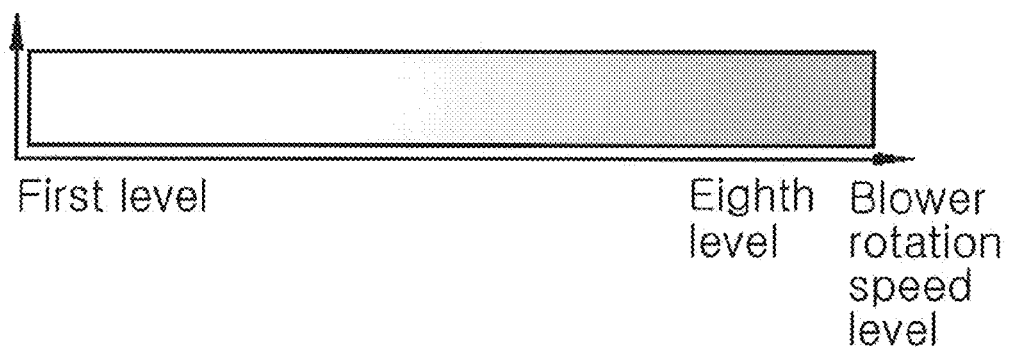
FIG. 5 is a view showing an operation example of the air conditioning system controller according to the first embodiment, in which view there is shown a color change chart which indicates a change of an illumination color of an illumination device depending on the blower rotation speed level under a heating condition.

As shown in FIG. 5, the heating-condition illumination colors associated with the blower rotation speed levels, which are stored in the second memory unit 34, are set so as to become darker warm colors as the blower rotation speed level grows higher.

More preferably, the heating-condition illumination colors stored in the second memory unit 34 are set such that the heating-condition illumination color corresponding to the lowest blower rotation speed level becomes an achromatic color, e.g., a white color. The remaining heating-condition illumination colors are set so as to become warm colors, e.g., yellow-based colors, whose chroma gradually increases as the blower rotation speed level grows higher.

The reason for employing the above configuration is to make sure that the heating-condition illumination colors associated with the blower rotation speed levels, which are stored in the second memory unit 34, are set to become yellow-based warm colors in conformity with the heating condition. This makes it possible to control the heating-condition illumination color of the mood lamp 4 so as to become yellow-based warm colors in a corresponding relationship with the heating condition.

Figure 6:
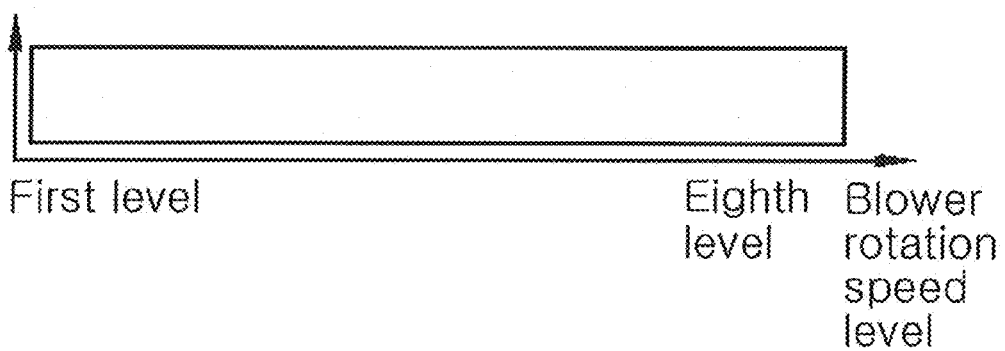
FIG. 6 is a view showing an operation example of the air conditioning system controller according to the first embodiment, in which view there is shown a color change chart which indicates a change of an illumination color of an illumination device depending on the blower rotation speed level under a cooling/heating mixed condition.

As shown in FIG. 6, the cooling/heating-mixed-condition illumination color associated with the blower rotation speed levels, which is stored in the third memory unit 36, is set so as to become an achromatic color, e.g., a white color, regardless of the blower rotation speed levels.

The reason for employing the above configuration is to make sure that the cooling/heating-mixed-condition illumination color associated with the blower rotation speed levels, which is stored in the third memory unit 36, is set to become a white color in conformity with the cooling/heating mixed condition. This makes it possible to control the cooling/heating-mixed-condition illumination color of the mood lamp 4 so as to become a white warm color in a corresponding relationship with the cooling/heating mixed condition.

Referring to FIGS. 2 and 3, if one of the cooling condition, the heating condition and the cooling/heating mixed condition is detected by the external air temperature condition detecting unit 10, the control unit 30 uses the detected condition as a data for changing the illumination colors of the light sources 4d. During the time period from the startup of a vehicle engine to the stoppage thereof, the detected condition is continuously used as the data for changing the illumination colors of the light sources 4d.

The reason for employing the above configuration is to prevent the illumination color of the mood lamp 4 from being frequently changed to one of the yellow-based color, the white color and the blue-based color each time when the external air temperature condition, i.e., the cooling/heating condition, input by the external air temperature condition detecting unit 10 is changed depending on the driving condition and driving environment of the motor vehicle.

In the case where the blower rotation speed level is manually changed by a user in the course of differently changing the illumination color of the mood lamp 4 in view of the external air temperature condition and the blower rotation speed level, the control unit 30 is configured to change the illumination color of the mood lamp 4 based on only the blower rotation speed level input by the automatic control unit 22a while neglecting the blower rotation speed level manually changed by the user.

The reason for employing the above configuration is that, if the blower rotation speed level is manually changed by the user, the blower rotation speed level is fixed at one specific level regardless of the cooling/heating load, as a result of which it becomes impossible to change the illumination color of the mood lamp 4 depending on the cooling/heating load.

As described above, the illumination color of the mood lamp 4 are changed pursuant to the blower rotation speed level input by the automatic control unit 22a and changed depending on the cooling/heating load. This makes it possible to differently change the illumination color of the mood lamp 4 depending on the cooling/heating load and to significantly improve the vehicle interior design.

Even if the blower rotation speed level is manually changed by the user, the automatic control unit 22a continuously calculates the optimal blower rotation speed level depending on the cooling/heating load.

Next, one example of an operation of the air conditioning system controller configured as above will be described with reference to FIGS. 2 to 7.

Figure 7:
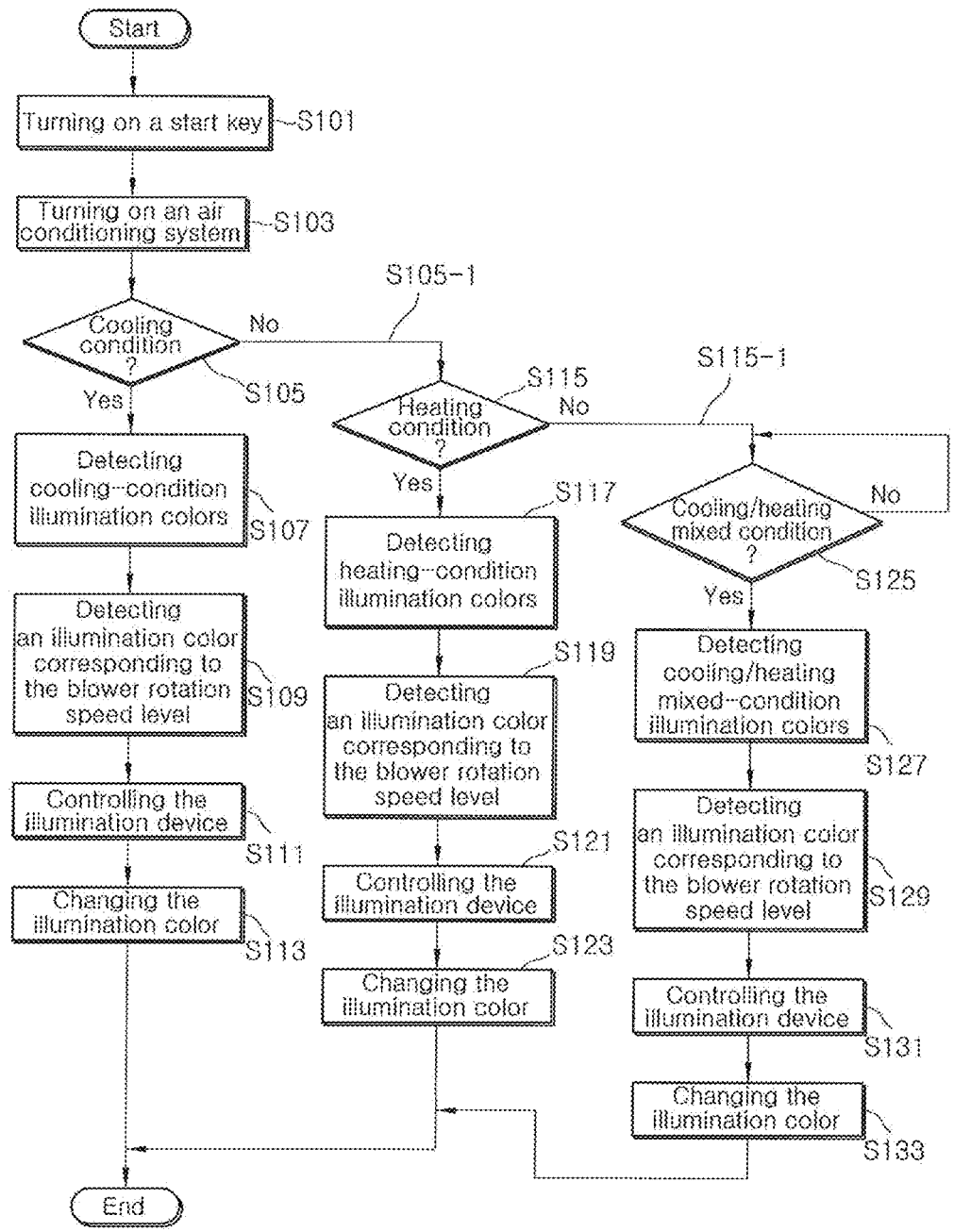
FIG. 7 is a flowchart showing an operation example of the air conditioning system controller according to the first embodiment.

Referring first to FIGS. 2 and 7, if a start key of the motor vehicle is turned on (S101) and if the air conditioning system is turned on (S103), the control unit 30 determines whether the current external air temperature condition is a cooling condition (S105).

If it is determined, at step S105, that the current external air temperature condition is the cooling condition, the control unit 30 detects the cooling-condition illumination colors associated with the blower rotation speed levels from the first memory unit 32 corresponding to the cooling condition (S107).

Thereafter, the control unit 30 detects a specific illumination color corresponding to the currently automatically-controlled blower rotation speed level from the cooling-condition illumination colors associated with the blower rotation speed levels (S109).

Then, the control unit 30 controls the illumination devices, i.e., the light sources 4*d*, of the mood lamp 4 in conformity with the specific illumination color thus detected (S111).

Consequently, the light emission color of the mood lamp 4 is changed in conformity with the cooling load, i.e., the blower rotation speed level, under the cooling condition (S113).

On the other hand, if it is determined, at step S105, that the current external air temperature condition is not the cooling condition (S105-1), the control unit 30 determines whether the current external air temperature condition is a heating condition (S115).

If it is determined, at step S115, that the current external air temperature condition is the heating condition, the control unit 30 detects the heating-condition illumination colors associated with the blower rotation speed levels from the second memory unit 34 corresponding to the heating condition (S117).

Thereafter, the control unit 30 detects a specific illumination color corresponding to the currently automatically-controlled blower rotation speed level from the heating-condition illumination colors associated with the blower rotation speed levels (S119).

Then, the control unit 30 controls the illumination devices, i.e., the light sources 4*d* of the mood lamp 4, in conformity with the specific illumination color thus detected (S121).

Consequently, the light emission color of the mood lamp 4 is changed in conformity with the heating load, i.e., the blower rotation speed level, under the heating condition (S123).

In the meantime, if it is determined, at step S115, that the current external air temperature condition is not the heating condition (S115-1), the control unit 30 determines whether the current external air temperature condition is a cooling/heating mixed condition (S125).

If it is determined, at step S125, that the current external air temperature condition is the cooling/heating mixed condition, the control unit 30 detects the cooling/heating-mixed-condition illumination colors associated with the blower rotation speed levels from the third memory unit 36 corresponding to the cooling/heating mixed condition (S127).

Thereafter, the control unit 30 detects a specific illumination color corresponding to the currently automatically-controlled blower rotation speed level from the cooling/heating-mixed-condition illumination colors associated with the blower rotation speed levels (S129).

Then, the control unit 30 controls the illumination devices, i.e., the light sources 4*d*, of the mood lamp 4 in conformity with the specific illumination color thus detected (S131).

Consequently, the light emission color of the mood lamp 4 is changed in conformity with the cooling/heating load, i.e., the blower rotation speed level, under the cooling/heating mixed condition (S133).

As described above, the air conditioning system controller for motor vehicles according to the first embodiment of the present invention has a configuration capable of differently changing the illumination colors of the illumination devices depending on the cooling/heating load. It is therefore possible to improve the vehicle room atmosphere and the vehicle interior design.

Furthermore, the air conditioning system controller according to the first embodiment has a configuration capable of differently changing the illumination colors of the illumination devices depending on the cooling/heating load and in view of the external air temperature condition. This makes it possible to finely divide the illumination color changing factors. It is therefore possible to differently change the illumination colors of the illumination device depending on the driving situation and driving environment of the motor vehicle.

Since the air conditioning system controller is capable of differently changing the illumination colors of the illumination device depending on the driving situation and driving environment of the motor vehicle, it is possible to further improve the vehicle room atmosphere and the vehicle interior design.

By improving the vehicle interior design in this way, it is possible to significantly enhance the marketability of the motor vehicle.

[Second Embodiment]

Next, an air conditioning system controller according to a second embodiment of the present invention will be described with reference to FIGS. 8 to 12.

Figure 8:
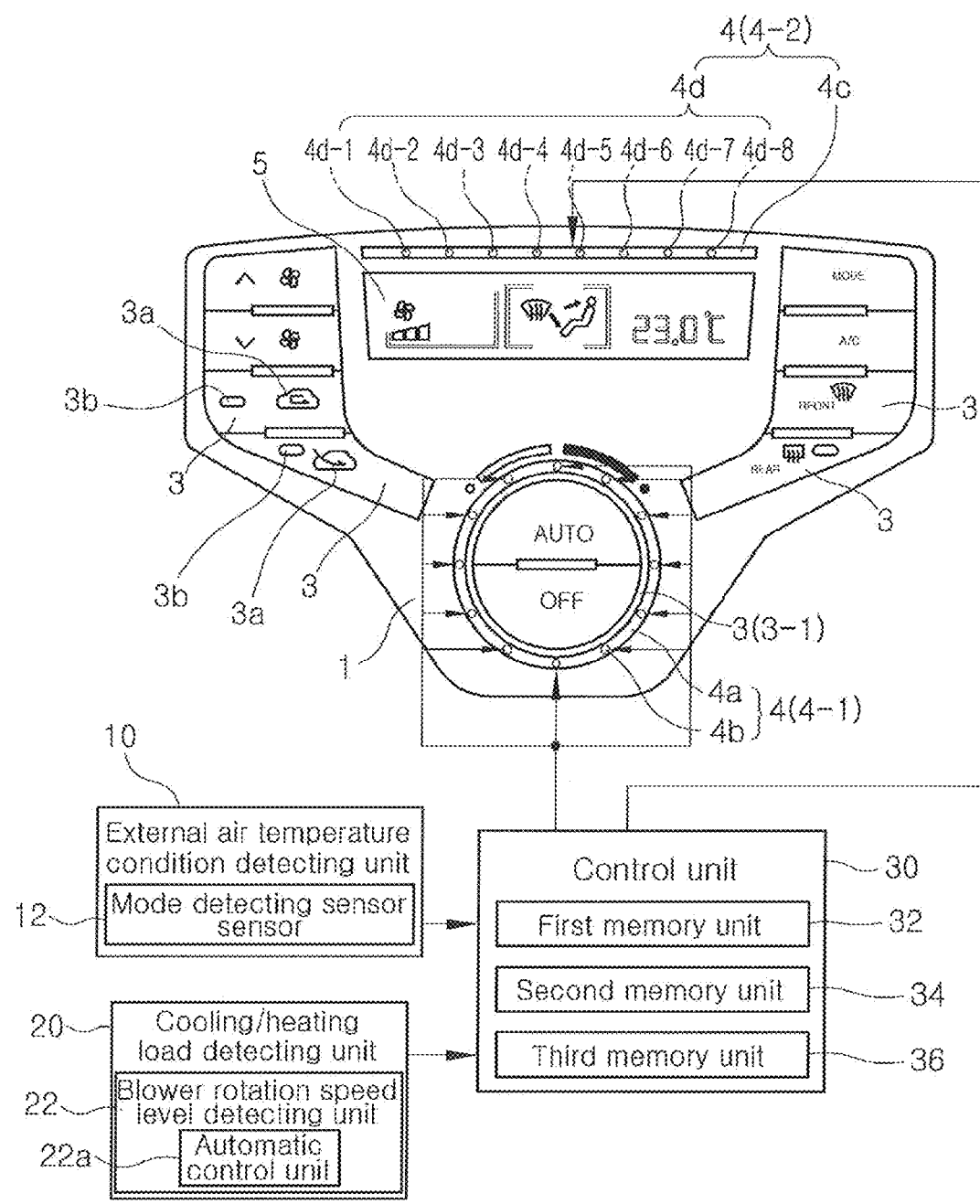
FIG. 8 is a view showing an air conditioning system controller for motor vehicles according to a second embodiment of the present invention.

Referring first to FIG. 8, it can be noted that the air conditioning system controller according to the second embodiment is identical in configuration with the air conditioning system controller according to the first embodiment.

While the control unit 30 of the air conditioning system controller according to the first embodiment uniformly controls the light emission colors of the light sources 4*d* depending on the cooling/heating load and the external air temperature condition, the control unit 30 of the air conditioning system controller according to the second embodiment is configured to individually control the light emission colors of the respective light sources 4*d* depending on the cooling/heating load and the external air temperature condition.

More specifically, if the cooling/heating load is input from the cooling/heating load detecting unit 20, namely if the blower rotation speed level is input from the blower rotation speed level detecting unit 22, the control unit 30 of the air conditioning system controller according to the second embodiment individually controls the respective light sources 4*d* of the mood lamp 4 depending on the input blower rotation speed level, whereby the light emission colors of different regions of the mood lamp 4 are changed on a region-by-region basis.

The control unit 30 stores in advance illumination colors of individual light sources associated with the cooling/heating loads, namely illumination colors associated with the blower rotation speed levels.

If a specific blower rotation speed level is input from the blower rotation speed level detecting unit 22, the control unit 30 detects the illumination colors of individual light sources corresponding to the specific blower rotation speed level thus input. Based on the illumination colors thus detected, the control unit 30 individually controls the light emission colors of respective light sources 4*d*-1, 4*d*-2, 4*d*-3, 4*d*-4, 4*d*-5, 4*d*-6, 4*d*-7 and 4*d*-8 of the mood lamp 4, thereby adjusting the light emission colors of the mood lamp 4 on a region-by-region basis.

The control unit 30 includes the first memory unit 32, the second memory unit 34 and the third memory unit 36.

The first memory unit 32 stores different cooling-condition illumination colors of individual light sources associated with the blower rotation speed levels under the cooling condition of the vehicle room. The second memory unit 34 stores different heating-condition illumination colors of individual light sources associated with the blower rotation speed levels under the heating condition of the vehicle room. The third memory unit 36 stores different cooling/heating-mixed-condition illumination colors of individual light sources associated with the blower rotation speed levels under the cooling/heating mixed condition of the vehicle room.

If the external air temperature condition detecting unit 10 detects whether the current external air temperature condition is the cooling condition, or the heating condition, or the cooling/heating mixed condition, the control unit 30 checks the memory unit 32, 34, 36 corresponding to the detected condition, detects the illumination colors of individual light sources associated with the blower rotation speed level from the checked memory unit 32, 34, 36, and controls the light emission colors of the respective light sources $4d$-1, $4d$-2, $4d$-3, $4d$-4, $4d$-5, $4d$-6, $4d$-7 and $4d$-8 of the mood lamp 4 based on the detected illumination colors.

For example, if the external air temperature condition detecting unit 10 detects that the current external air temperature condition is the cooling condition, the control unit 30 detects the cooling-condition illumination colors of individual light sources associated with the blower rotation speed levels from the first memory unit 32 and individually controls the light sources $4d$-1, $4d$-2, $4d$-3, $4d$-4, $4d$-5, $4d$-6, $4d$-7 and $4d$-8 of the mood lamp 4 based on the detected cooling-condition illumination colors.

Specifically, the control unit 30 detects the illumination colors corresponding to the blower rotation speed level input by the blower rotation speed level detecting unit 22 from the cooling-condition illumination colors of individual light sources stored in the first memory unit 32 and then individually controls the light emission colors of the respective light sources $4d$-1, $4d$-2, $4d$-3, $4d$-4, $4d$-5, $4d$-6, $4d$-7 and $4d$-8 in conformity with the cooling-condition illumination colors of individual light sources thus detected.

Thus, the light emission colors of different regions of the mood lamp 4 can be differently changed under the cooling condition depending on the blower rotation speed level. As a result, the light emission colors of different regions of the mood lamp 4 can be differently changed depending on the cooling load.

If the external air temperature condition detecting unit 10 detects that the current external air temperature condition is the heating condition, the control unit 30 detects the heating-condition illumination colors of individual light sources associated with the blower rotation speed levels from the second memory unit 34 and individually controls the light sources $4d$-1, $4d$-2, $4d$-3, $4d$-4, $4d$-5, $4d$-6, $4d$-7 and $4d$-8 of the mood lamp 4 based on the detected heating-condition illumination colors of individual light sources.

Specifically, the control unit 30 detects the illumination colors of individual light sources corresponding to the blower rotation speed level input by the blower rotation speed level detecting unit 22 from the heating-condition illumination colors of individual light sources stored in the second memory unit 34 and then individually controls the light emission colors of the respective light sources $4d$-1, $4d$-2, $4d$-3, $4d$-4, $4d$-5, $4d$-6, $4d$-7 and $4d$-8 in conformity with the illumination colors of individual light sources thus detected.

Thus, the light emission colors of different regions of the mood lamp 4 can be differently changed under the heating condition depending on the blower rotation speed level. As a result, the light emission colors of different regions of the mood lamp 4 can be differently changed depending on the heating load.

If the external air temperature condition detecting unit 10 detects that the current external air temperature condition is the cooling/heating mixed condition, the control unit 30 detects the cooling/heating-mixed-condition illumination colors of individual light sources associated with the blower rotation speed levels from the third memory unit 36 and individually controls the light sources $4d$-1, $4d$-2, $4d$-3, $4d$-4, $4d$-5, $4d$-6, $4d$-7 and $4d$-8 of the mood lamp 4 based on the detected cooling/heating-mixed-condition illumination colors of individual light sources.

Specifically, the control unit 30 detects the illumination colors of individual light sources corresponding to the blower rotation speed level input by the blower rotation speed level detecting unit 22 from the cooling/heating-mixed-condition illumination colors of individual light sources stored in the third memory unit 36 and then controls the light emission colors of the respective light sources $4d$-1, $4d$-2, $4d$-3, $4d$-4, $4d$-5, $4d$-6, $4d$-7 and $4d$-8 in conformity with the illumination colors of individual light sources thus detected.

Thus, the light emission colors of different regions of the mood lamp 4 can be differently changed under the cooling/heating mixed condition depending on the blower rotation speed level. As a result, the light emission colors of different regions of the mood lamp 4 can be differently changed depending on the cooling/heating mixed condition.

The illumination colors of individual light sources associated with the blower rotation speed levels are stored at different values in the memory units 32, 34, 36.

Preferably, among the cooling-condition illumination colors of individual light sources stored in the first memory unit 32, the cooling-condition illumination colors of individual light sources corresponding to a predetermined reference blower rotation speed level or less, e.g., a fourth or lower blower rotation speed level, are set so as to become a white color. The cooling-condition illumination colors of individual light sources corresponding to a fifth or higher blower rotation speed level are set to become a blue-based color having different chromas corresponding to the respective light sources $4d$-1, $4d$-2, $4d$-3, $4d$-4, $4d$-5, $4d$-6, $4d$-7 and $4d$-8.

More preferably, the cooling-condition illumination colors of individual light sources corresponding to a fifth or higher blower rotation speed level are set to become a blue-based color having different chromas corresponding to the respective light sources $4d$-1, $4d$-2, $4d$-3, $4d$-4, $4d$-5, $4d$-6, $4d$-7 and $4d$-8 such that the chromas of the blue-based color grow higher in an arrangement order of the light sources $4d$-1, $4d$-2, $4d$-3, $4d$-4, $4d$-5, $4d$-6, $4d$-7 and $4d$-8.

Thus, if the blower rotation speed level input from the blower rotation speed level detecting unit 22 under the cooling condition is a fourth or lower level, the control unit 30 can control the respective light sources $4d$-1, $4d$-2, $4d$-3, $4d$-4, $4d$-5, $4d$-6, $4d$-7 and $4d$-8 of the mood lamp 4 in a white color.

If the blower rotation speed level input from the blower rotation speed level detecting unit 22 under the cooling condition is a fifth or higher level, the control unit 30 can control the respective light sources 4d-1, 4d-2, 4d-3, 4d-4, 4d-5, 4d-6, 4d-7 and 4d-8 of the mood lamp 4 in a blue-based color having different chromas. Particularly, the control unit 30 can control the respective light sources 4d-1, 4d-2, 4d-3, 4d-4, 4d-5, 4d-6, 4d-7 and 4d-8 of the mood lamp 4 in a blue-based color such that the chromas of the blue-based color grow higher in an arrangement order of the light sources 4d-1, 4d-2, 4d-3, 4d-4, 4d-5, 4d-6, 4d-7 and 4d-8. This enables the mood lamp 4 to emit light having a blue-based color whose chromas differ on a region-by-region basis.

The reason for employing the above configuration is as follows. If the blower rotation speed level is a fourth or lower level, it means that the cooling load is small and the vehicle room temperature is stable. In case where the cooling load is small, the colors of different regions of the mood lamp 4 are controlled to become a white color, thereby allowing a user to recognize that the vehicle room temperature is stable. If the blower rotation speed level is a fifth or higher level, it means that the cooling load is large and the vehicle room temperature is high. In case where the cooling load is large, the colors of different regions of the mood lamp 4 are controlled to become a blue-based color having different chromas, thereby allowing a user to recognize that the vehicle room is being rapidly cooled.

Preferably, among the heating-condition illumination colors of individual light sources stored in the second memory unit 34, the heating-condition illumination colors of individual light sources corresponding to a predetermined reference blower rotation speed level or less, e.g., a fourth or lower blower rotation speed level, are set so as to become a white color. The heating-condition illumination colors of individual light sources corresponding to a fifth or higher blower rotation speed level are set to become a yellow-based color having different chromas corresponding to the respective light sources 4d-1, 4d-2, 4d-3, 4d-4, 4d-5, 4d-6, 4d-7 and 4d-8.

More preferably, the heating-condition illumination colors of individual light sources corresponding to a fifth or higher blower rotation speed level are set to become a yellow-based color having different chromas corresponding to the respective light sources 4d-1, 4d-2, 4d-3, 4d-4, 4d-5, 4d-6, 4d-7 and 4d-8 such that the chromas of the yellow-based color grow higher in an arrangement order of the light sources 4d-1, 4d-2, 4d-3, 4d-4, 4d-5, 4d-6, 4d-7 and 4d-8.

Thus, if the blower rotation speed level input from the blower rotation speed level detecting unit 22 under the heating condition is a fourth or lower level, the control unit 30 can control the respective light sources 4d-1, 4d-2, 4d-3, 4d-4, 4d-5, 4d-6, 4d-7 and 4d-8 of the mood lamp 4 in a white color.

If the blower rotation speed level inputted from the blower rotation speed level detecting unit 22 under the heating condition is a fifth or higher level, the control unit 30 can control the respective light sources 4d-1, 4d-2, 4d-3, 4d-4, 4d-5, 4d-6, 4d-7 and 4d-8 of the mood lamp 4 in a yellow-based color having different chromas. Particularly, the control unit 30 can control the respective light sources 4d-1, 4d-2, 4d-3, 4d-4, 4d-5, 4d-6, 4d-7 and 4d-8 of the mood lamp 4 in a yellow-based color such that the chromas of the yellow-based color grow higher in an arrangement order of the light sources 4d-1, 4d-2, 4d-3, 4d-4, 4d-5, 4d-6, 4d-7 and 4d-8. This enables the mood lamp 4 to emit light having a yellow-based color whose chromas differ on a region-by-region basis.

The reason for employing the above configuration is as follows. If the blower rotation speed level is a fourth or lower level, it means that the heating load is small and the vehicle room temperature is stable. In case where the heating load is small, the colors of different regions of the mood lamp 4 are controlled to become a white color, thereby allowing a user to recognize that the vehicle room temperature is stable. If the blower rotation speed level is a fifth or higher level, it means that the heating load is large and the vehicle room temperature is low. In case where the heating load is large, the colors of different regions of the mood lamp 4 are controlled to become a blue-based color having different chromas, thereby allowing a user to recognize that the vehicle room is being rapidly heated.

It is preferred that the cooling/heating-mixed-condition illumination colors of individual light sources stored in the third memory unit 36 are all set to becomes a white color regardless of the blower rotation speed level.

Thus, if the blower rotation speed level is input from the blower rotation speed level detecting unit 22 under the cooling/heating mixed condition, the control unit 30 can control the respective light sources 4d-1, 4d-2, 4d-3, 4d-4, 4d-5, 4d-6, 4d-7 and 4d-8 of the mood lamp 4 in a white color.

The reason for employing the above configuration is as follows. Under the cooling/heating mixed condition, the cooling/heating load is small and the vehicle room temperature is stable. In case where the cooling/heating load is small, the colors of different regions of the mood lamp 4 are controlled to become a white color, thereby allowing a user to recognize that the vehicle room temperature is stable.

Referring again to FIG. 8, if the blower rotation speed level input from the blower rotation speed level detecting unit 22 is higher than the reference blower rotation speed level when the external air temperature condition input from the external air temperature condition detecting unit 10 is the cooling condition, the control unit 30 controls the respective light sources 4d-1, 4d-2, 4d-3, 4d-4, 4d-5, 4d-6, 4d-7 and 4d-8 of the mood lamp 4 in a blue-based color having different chromas such that the display position of the light emission color of each of the respective light sources 4d-1, 4d-2, 4d-3, 4d-4, 4d-5, 4d-6, 4d-7 and 4d-8 is sequentially shifted in one direction at a predetermined time interval.

Figure 9:
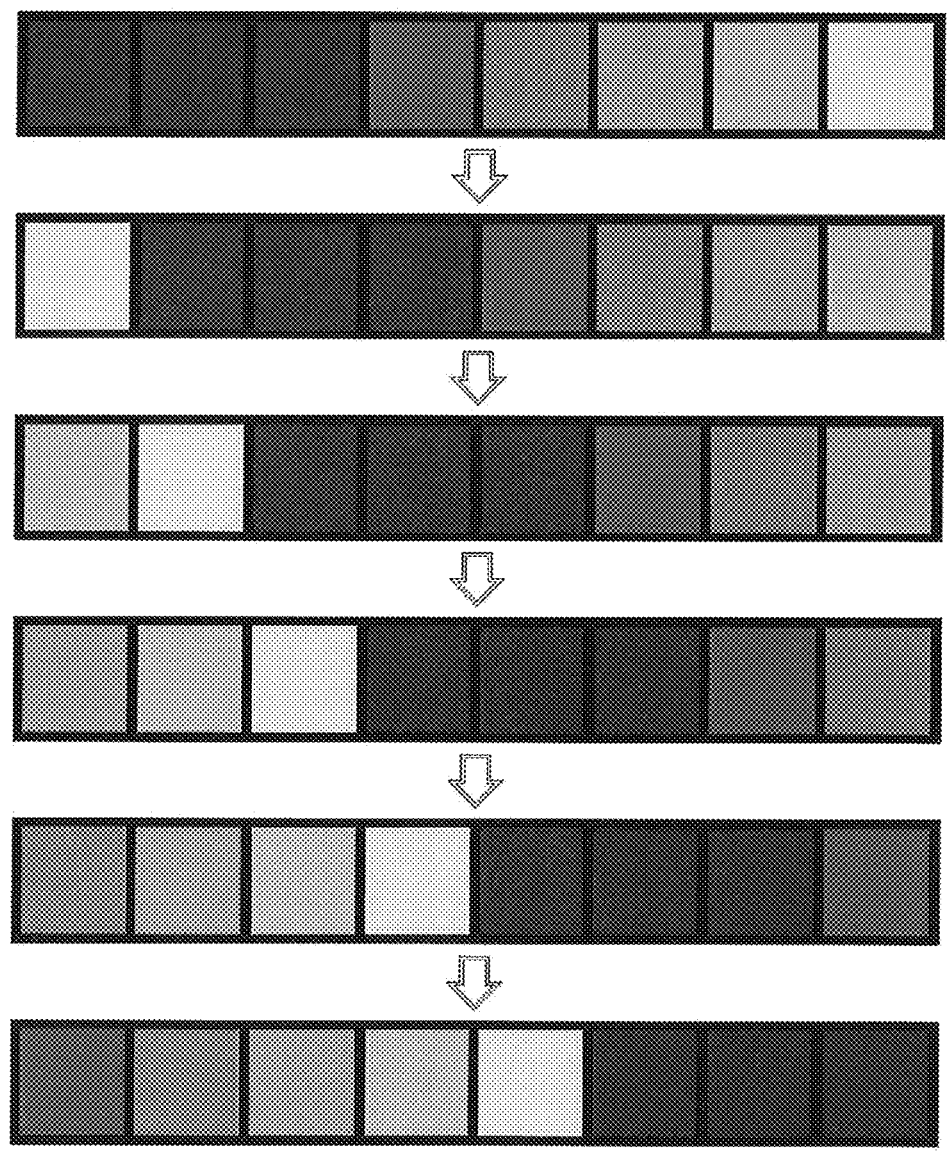
FIG. 9 is a view showing an operation example of the air conditioning system controller according to the second embodiment, in which view there is shown a change of an illumination color in the respective regions of an illumination device when a blower rotation speed level is kept high under a cooling condition.

More specifically, as shown in FIG. 9, while controlling the light emission colors of the respective light sources 4d-1, 4d-2, 4d-3, 4d-4, 4d-5, 4d-6, 4d-7 and 4d-8 of the mood lamp 4 to become a blue-based color having different aromas under the cooling condition, the control unit 30 controls the respective light sources 4d-1, 4d-2, 4d-3, 4d-4, 4d-5, 4d-6, 4d-7 and 4d-8 such that the display position of the light emission color having a specific chroma is sequentially shifted from one of the light sources to the adjoining light source at a predetermined time interval.

Thus, the display position of the light emission color of each of the respective light sources 4d-1, 4d-2, 4d-3, 4d-4, 4d-5, 4d-6, 4d-7 and 4d-8 is continuously moved in one direction. This enables a user to easily recognize that the vehicle room is being rapidly cooled at the present time.

Figure 10:
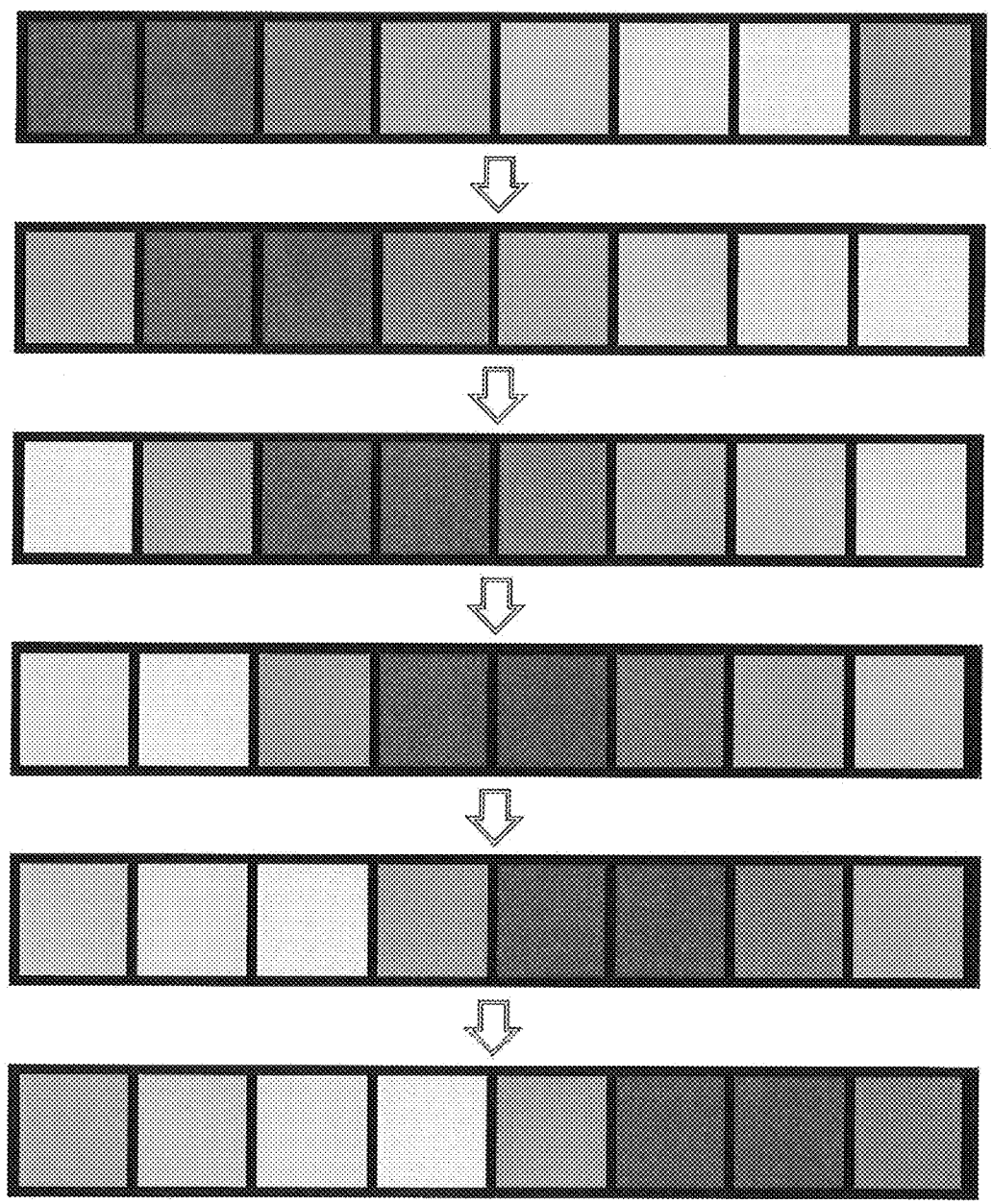
FIG. 10 is a view showing an operation example of the air conditioning system controller according to the second embodiment, in which view there is shown a change of an illumination color in the respective regions of an illumination device when a blower rotation speed level is kept high under a heating condition.

Similarly, as shown in FIG. 10, while controlling the light emission colors of the respective light sources 4d-1, 4d-2, 4d-3, 4d-4, 4d-5, 4d-6, 4d-7 and 4d-8 of the mood lamp 4 to become a yellow-based color having different chromas under the heating condition, the control unit 30 controls the respective light sources 4d-1, 4d-2, 4d-3, 4d-4, 4d-5, 4d-6, 4d-7 and 4d-8 such that the display position of the light emission color having a specific chroma is sequentially shifted from one of the light sources to the adjoining light source at a predetermined time interval.

Thus, the display position of the light emission color of each of the respective light sources 4*d*-1, 4*d*-2, 4*d*-3, 4*d*-4, 4*d*-5, 4*d*-6, 4*d*-7 and 4*d*-8 is continuously moved in one direction. This enables a user to easily recognize that the vehicle room is being rapidly heated at the present time.

Next, one example of an operation of the air conditioning system controller according to the second embodiment will be described with reference to FIGS. 8 to 12.

Figure 11:
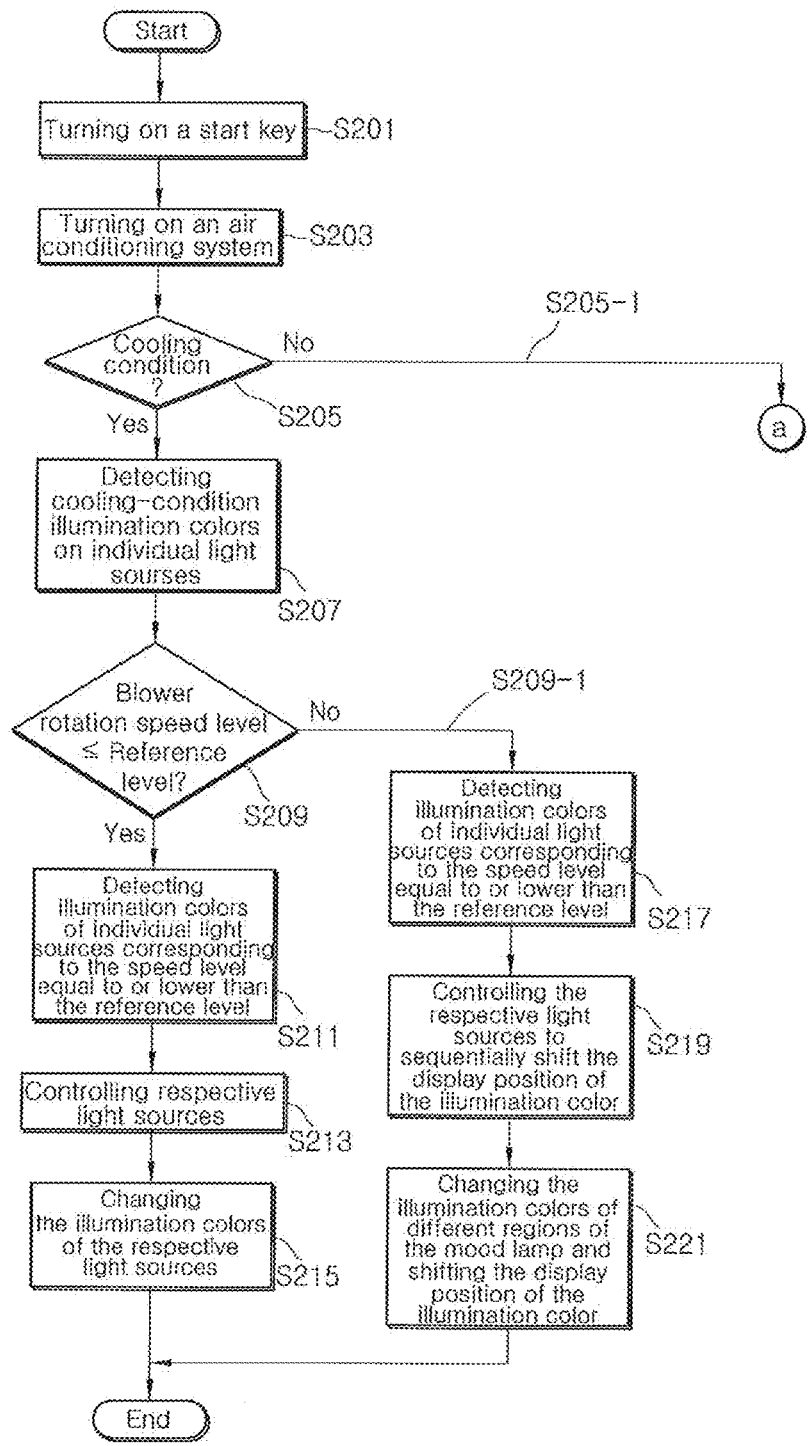
FIGS. 11 and 12 are flowcharts showing an operation example of the air conditioning system controller according to the second embodiment.
Figure 12:
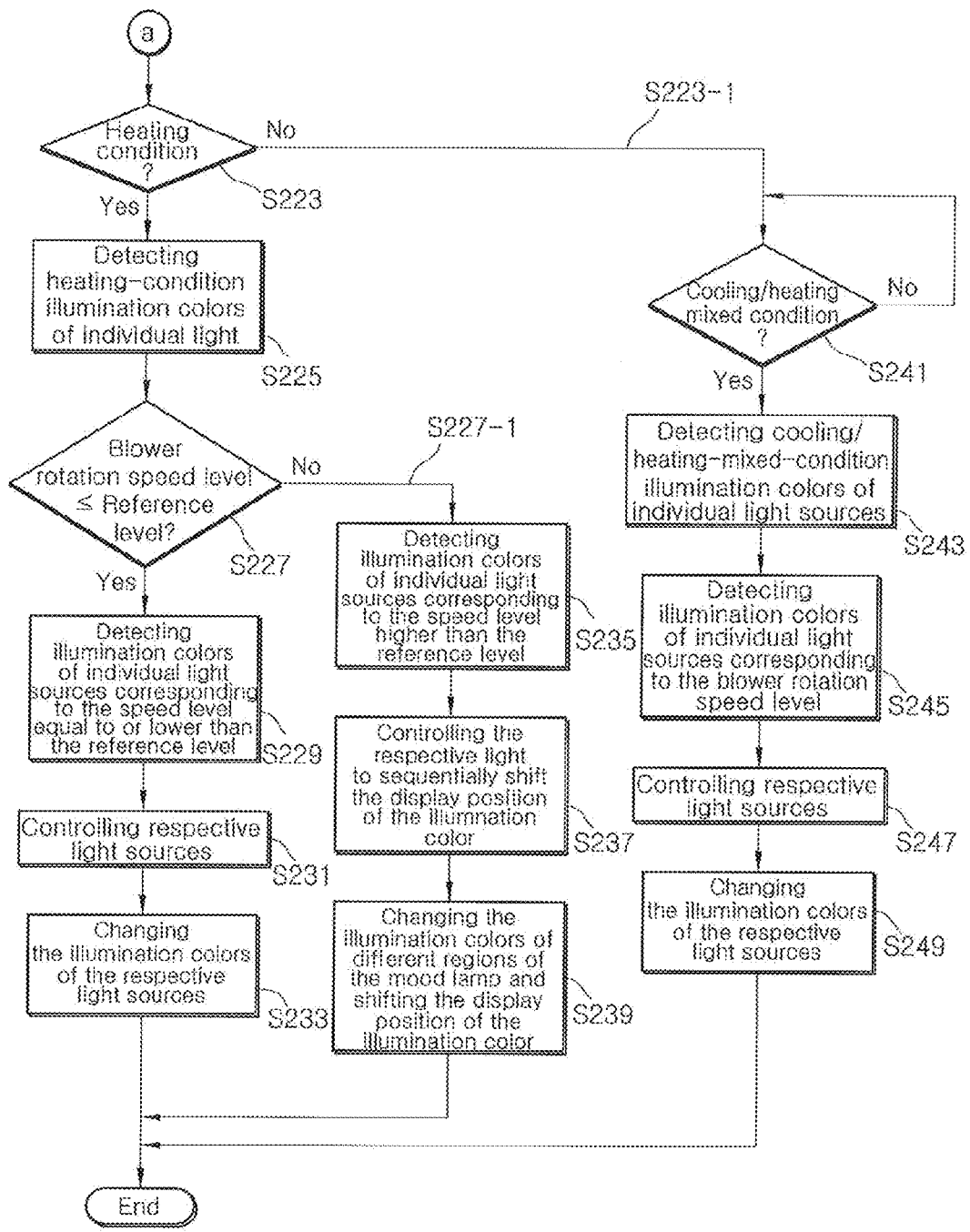

Referring first to FIGS. 8, 11 and 12, if the start key of the motor vehicle is turned on (S201) and if the air conditioning system is turned on (S203), the control unit 30 determines whether the current external air temperature condition is a cooling condition (S205).

If it is determined, at step S205, that the current external air temperature condition is the cooling condition, the control unit 30 detects the cooling-condition illumination colors of individual light sources associated with the blower rotation speed levels from the first memory unit 32 corresponding to the cooling condition (S207).

Thereafter, the control unit 30 determines whether the currently automatically-controlled blower rotation speed level is equal to or lower than a predetermined reference blower rotation speed level, e.g., a fourth level (S209).

If it is determined, at step S209, that the currently automatically-controlled blower rotation speed level is equal to or lower than the predetermined reference blower rotation speed level, the control unit 30 detects the illumination colors of individual light sources corresponding to the blower rotation speed levels equal to or lower than the reference blower rotation speed level from the cooling-condition illumination colors of individual light sources detected at S207 (S211).

Then, the control unit 30 controls the respective light sources 4*d*-1, 4*d*-2, 4*d*-3, 4*d*-4, 4*d*-5, 4*d*-6, 4*d*-7 and 4*d*-8 of the mood lamp 4 in conformity with the illumination colors of individual light sources corresponding to the blower rotation speed levels equal to or lower than the reference blower rotation speed level thus detected (S213).

As a result, the light emission colors of the different regions of the mood lamp 4 are changed in conformity with the cooling condition and the blower rotation speed levels equal to or lower than the reference blower rotation speed level (S215). For example, the light emission colors of different regions of the mood lamp 4 are controlled to become a white color.

On the other hand, if it is determined, at step S209, that the currently automatically-controlled blower rotation speed level is not equal to or lower than the predetermined reference blower rotation speed level (S209-1), namely if the currently automatically-controlled blower rotation speed level is equal to or higher than a fifth level, the control unit 30 detects the illumination colors of individual light sources corresponding to the blower rotation speed levels higher than the reference blower rotation speed level from the cooling-condition illumination colors of individual light sources detected at step S207 (S217).

Then, the control unit 30 controls the respective light sources 4*d*-1, 4*d*-2, 4*d*-3, 4*d*-4, 4*d*-5, 4*d*-6, 4*d*-7 and 4*d*-8 of the mood lamp 4 in conformity with the illumination colors of individual light sources corresponding to the blower rotation speed levels higher than the reference blower rotation speed level (8219) (see FIG. 8).

At this time, the control unit 30 controls the respective light sources 4*d*-1, 4*d*-2, 4*d*-3, 4*d*-4, 4*d*-5, 4*d*-6, 4*d*-7 and 4*d*-8 such that the display position of the light emission color of each of the respective light sources 4*d*-1, 4*d*-2, 4*d*-3, 4*d*-4, 4*d*-5, 4*d*-6, 4*d*-7 and 4*d*-8 is sequentially shifted in one direction at a predetermined time interval.

As a result, the light emission colors of different regions of the mood lamp 4 are changed in conformity with the cooling condition and the blower rotation speed levels higher than the reference blower rotation speed level (S221). That is to say, the light emission colors of different regions of the mood lamp 4 are displayed in a blue-based color having different chromas on a region-by-region basis and the display position of the blue-based color having different chromas is sequentially shifted from one region to another adjoining region (see FIG. 9).

Referring again to FIGS. 11 and 12, if it is determined, at step S205, that the current external air temperature condition is not the cooling condition (S205-1), the control unit 30 determines whether the current external air temperature condition is a heating condition (S223)

If it is determined, at step S223, that the current external air temperature condition is the heating condition, the control unit 30 detects the heating-condition illumination colors of individual light sources associated with the blower rotation speed levels from the second memory unit 34 corresponding to the heating condition (S225).

Thereafter, the control unit 30 determines whether the currently automatically-controlled blower rotation speed level is equal to or lower than a predetermined reference blower rotation speed level, e.g., a fourth level (S227).

If it is determined, at step S227, that the currently automatically-controlled blower rotation speed level is equal to or lower than the predetermined reference blower rotation speed level, the control unit 30 detects the illumination colors of individual light sources corresponding to the blower rotation speed levels equal to or lower than the reference blower rotation speed level from the heating-condition illumination colors of individual light sources detected at step S225 (S229).

Then, the control unit 30 controls the respective light sources 4*d*-1, 4*d*-2, 4*d*-3, 4*d*-4, 4*d*-5, 4*d*-6, 4*d*-7 and 4*d*-8 of the mood lamp 4 in conformity with the illumination colors of individual light sources corresponding to the blower rotation speed levels equal to or lower than the reference blower rotation speed level thus detected (S231) (see FIG. 8).

As a result, the light emission colors of different regions of the mood lamp 4 are changed in conformity with the cooling condition and the blower rotation speed levels equal to or lower than the reference blower rotation speed level (S233). For example, the light emission colors of different regions of the mood lamp 4 are controlled to become a white color.

On the other hand, if it is determined, at step S227, that the currently automatically-controlled blower rotation speed level is not equal to or lower than the predetermined reference blower rotation speed level (S227-1), namely if the currently automatically-controlled blower rotation speed level is equal to or higher than a fifth level, the control unit 30 detects the illumination colors of individual light sources corresponding to the blower rotation speed levels higher than the reference blower rotation speed level from the heating-condition illumination colors of individual light sources detected at step S225 (S235).

Then, the control unit 30 controls the respective light sources 4*d*-1, 4*d*-2, 4*d*-3, 4*d*-4, 4*d*-5, 4*d*-6, 4*d*-7 and 4*d*-8 of the mood lamp 4 in conformity with the illumination colors of individual light sources corresponding to the blower rotation speed levels higher than the reference blower rotation speed level (S237) (see FIG. 8)

At this time, the control unit 30 controls the respective light sources 4d-1, 4d-2, 4d-3, 4d-4, 4d-5, 4d-6, 4d-7 and 4d-8 such that the display position of the light emission color of each of the respective light sources 4d-1, 4d-2, 4d-3, 4d-4, 4d-5, 4d-6, 4d-7 and 4d-8 is sequentially shifted in one direction at a predetermined time interval.

As a result, the light emission colors of different regions of the mood lamp 4 are changed in conformity with the cooling condition and the blower rotation speed levels higher than the reference blower rotation speed level (S239). That is to say, the light emission colors of different regions of the mood lamp 4 are displayed in a yellow-based color having different chromas on a region-by-region basis and the display position of the yellow-based color having different chromas is sequentially shifted from one region to another adjoining region (see FIG. 10).

Referring again to FIG. 12, if it is determined, at step S223, that the current external air temperature condition is not the heating condition (S223-1), the control unit 30 determines whether the current external air temperature condition is a cooling/heating mixed condition (S241).

If it is determined, at step S241, that the current external air temperature condition is the cooling/heating mixed condition, the control unit 30 detects the cooling/heating-mixed-condition illumination colors of individual light sources associated with the blower rotation speed levels from the third memory unit 36 corresponding to the cooling/heating mixed condition (S243).

Thereafter, the control unit 30 detects the illumination colors of individual light sources corresponding to the currently automatically-controlled blower rotation speed level from the cooling/heating-mixed-condition illumination colors of individual light sources detected at step S243, (S245).

Then, the control unit 30 controls the respective light sources 4d-1, 4d-2, 4d-3, 4d-4, 4d-5, 4d-6, 4d-7 and 4d-8 of the mood lamp 4 in conformity with the illumination colors of individual light sources corresponding to the currently automatically-controlled blower rotation speed level (S247) (see FIG. 8).

As a result, the light emission colors of different regions of the mood lamp 4 are changed in conformity with the cooling/heating mixed condition and the currently automatically-controlled blower rotation speed level (S249). For example, the light emission colors of different regions of the mood lamp 4 are controlled to become a white color.

The air conditioning system controller of the second embodiment configured as above has a configuration capable of differently changing the illumination colors of the illumination devices depending on the cooling/heating load and capable of differently controlling the illumination colors of different regions of the illumination devices in case where the cooling/heating load is large. This makes it possible to greatly improve the vehicle room illumination. It is possible to provide an effect of significantly enhancing the marketability of the motor vehicle.

Furthermore, the air conditioning system controller of the second embodiment has a configuration capable of differently controlling the illumination colors of different regions of the illumination devices in the case where the cooling/heating load is large. It is therefore possible to provide an effect of enabling a user to recognize that the vehicle room is being rapidly cooled or heated at the present time.

[Third Embodiment]

Next, an air conditioning system controller according to a third embodiment of the present invention will be described with reference to FIGS. 13 and 14.

Figure 13:
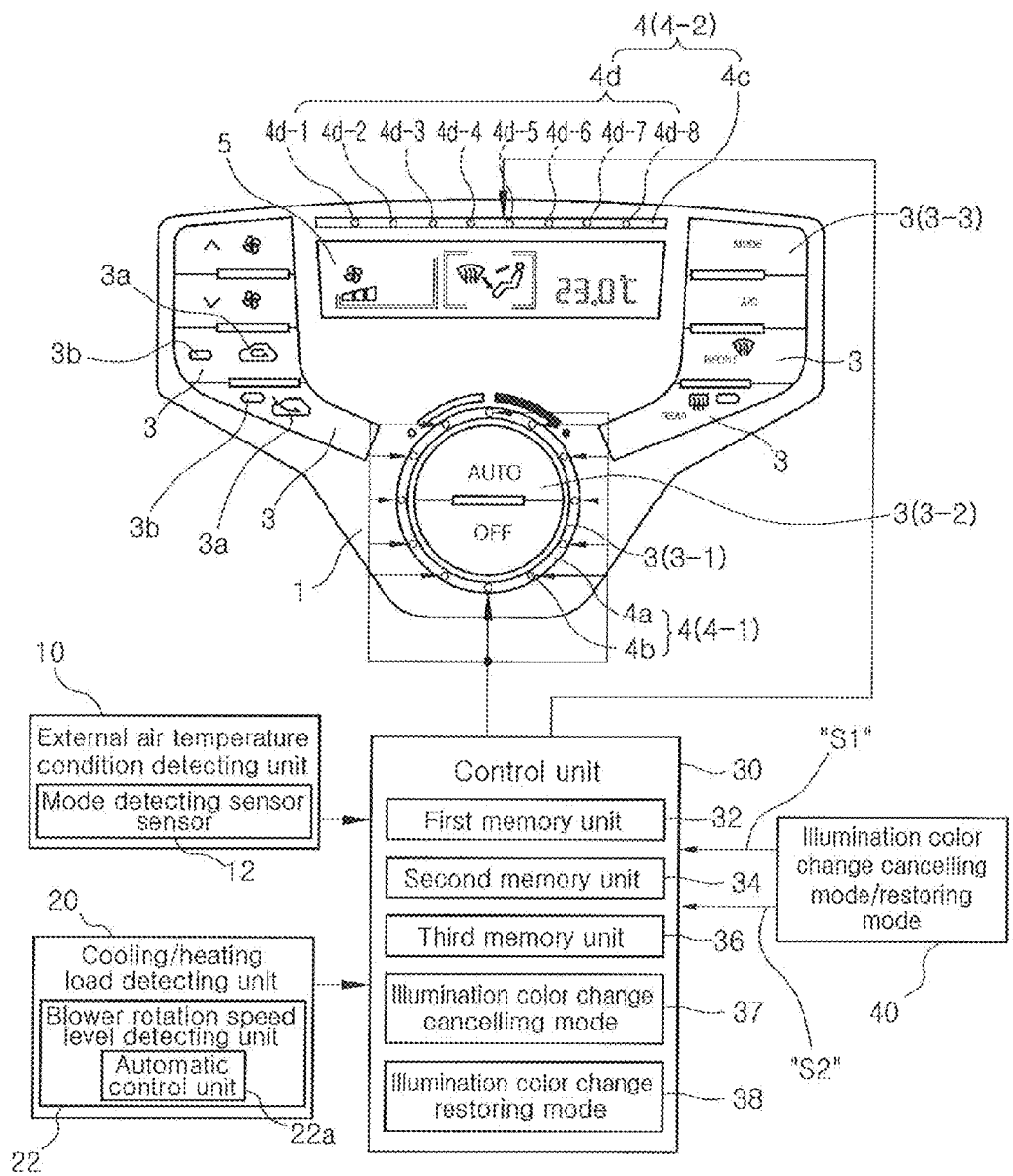
FIG. 13 is a view showing an air conditioning system controller for motor vehicles according to a third embodiment of the present invention.

Referring first to FIG. 13, the air conditioning system controller of the third embodiment includes not only the components of the air conditioning system controller of the first embodiment or the second embodiment but also an illumination color change cancelling/restoring unit for cancelling or restoring the illumination color change of the illumination device. The illumination color change cancelling/restoring unit includes an illumination color change cancelling/restoring mode entry unit 40 and the control unit 30.

The illumination color change cancelling/restoring mode entry unit 40 is configured to allow the control unit 30 to enter a mode for cancelling the change of the illumination colors of the illumination devices, i.e., the light sources 4d (hereinafter referred to as an "illumination color change cancelling mode 37") or a mode for restoring the change of the illumination colors of the illumination devices, i.e., the light sources 4d (hereinafter referred to as an "illumination color change restoring mode 38"). The illumination color change cancelling/restoring mode entry unit 40 is formed of two button-type switches selected from a plurality of switches 3 installed in the air conditioning system controller. For example, the illumination color change cancelling/restoring mode entry unit 40 is formed of an auto-mode switch 3-2 and a mode selection switch 3-3.

The illumination color change cancelling/restoring mode entry unit 40 is configured to output an illumination color change cancelling mode entry signal S1 if one of the auto-mode switch 3-2 and the mode selection switch 3-3 is pushed and then the other is pushed a predetermined number of times within a predetermined time while the change of the illumination colors of the illumination devices is permitted.

For example, if the mode selection switch 3-3 is fast pushed four times or more within two seconds while pushing the auto-mode switch 3-2, the illumination color change cancelling/restoring mode entry unit 40 outputs the illumination color change cancelling mode entry signal S1.

On the other hand, if the auto-mode switch 3-2 is pushed and then the mode selection switch 3-3 is fast pushed four times or more within two seconds while the change of the illumination colors of the illumination devices is cancelled, the illumination color change cancelling/restoring mode entry unit 40 outputs an illumination color change restoring mode entry signal S2.

The illumination color change cancelling/restoring mode entry unit 40 allows the control unit 30 to enter the illumination color change cancelling mode or the illumination color change restoring mode when specific switches are pushed in a predetermined manner.

Referring again to FIG. 13, if the illumination color change cancelling mode entry signal S1 is input from the illumination color change cancelling/restoring mode entry unit 40, the control unit 30 determines that a user does not wish to change the illumination colors.

Upon making such determination, the control unit 30 enters the illumination color change cancelling mode 37 in which the control unit 30 cancels the illumination color change by controlling the light sources 4d of the illumination device.

Thus, the control unit 30 stops to change the illumination colors and controls the illumination colors of the illumination device to become one specific color. This enables a user to restrain the change of the illumination colors of the illumination devices if such a need arises.

It is preferred that, if the illumination color change cancelling mode entry signal S1 is input from the illumination color change cancelling/restoring mode entry unit 40, the control unit 30 causes the light sources 4*d* of the illumination devices to flicker a predetermined number of times at a predetermined time interval and then cancels the change of the illumination colors of the illumination devices.

For example, if the illumination color change cancelling mode entry signal S1 is input from the illumination color change cancelling/restoring mode entry unit 40, the control unit 30 causes the light sources 4*d* of the illumination devices to flicker three times at an interval of 0.5 second and then cancels the change of the illumination colors of the illumination devices.

By allowing the illumination devices to flicker a predetermined number of times prior to cancelling the illumination color change, it is possible to notify a user of the fact that the change of the illumination colors will be cancelled soon.

When cancelling the change of the illumination colors of the illumination devices, the control unit 30 controls the illumination colors of the illumination devices to become one specific color which is identical with the illumination color of other illumination devices whose illumination color remains unchanged. For example, the control unit 30 controls the illumination colors of the illumination devices to become identical with the color of the symbols 3*a* of the switches 3 and the background color of the display unit 5. As a result, the illumination colors of the mood lamps 4 coincide with the color of the symbols 3*a* of the switches 3 and the background color of the display unit 5.

Referring again to FIG. 13, if the illumination color change restoring mode entry signal S2 is input from the illumination color change cancelling/restoring mode entry unit 40 while the change of the illumination colors of the illumination device is cancelled, the control unit 30 determines that a user wishes to change the illumination colors.

Upon making such determination, the control unit 30 enters the illumination color change restoring mode 38 in which the control unit 30 permits the illumination color change by controlling the light sources 4*d* of the illumination device.

It is therefore possible to restore the change of the illumination colors of the illumination devices. Thus, the illumination colors of the mood lamps 4 can be differently changed depending on specific conditions.

It is preferred that, if the illumination color change restoring mode entry signal S2 is input from the illumination color change cancelling/restoring mode entry unit 40, the control unit 30 causes the light sources 4*d* of the illumination devices to flicker a predetermined number of times at a predetermined time interval and then starts to change the illumination colors of the illumination devices.

For example, if the illumination color change restoring mode entry signal S2 is input from the illumination color change cancelling/restoring mode entry unit 40, the control unit 30 causes the light sources 4*d* of the illumination devices to flicker three times at an interval of 0.5 second and then starts to change the illumination colors of the illumination devices.

By allowing the illumination devices to flicker a predetermined number of times prior to restoring the illumination color change, it is possible to notify a user of the fact that the change of the illumination colors will be restored soon.

Next, one example of an operation of the air conditioning system controller of the third embodiment configured as above will be described with reference to FIGS. 13 and 14.

First, description will be made on an operation of cancelling the change of the illumination color of the illumination devices.

Figure 14:
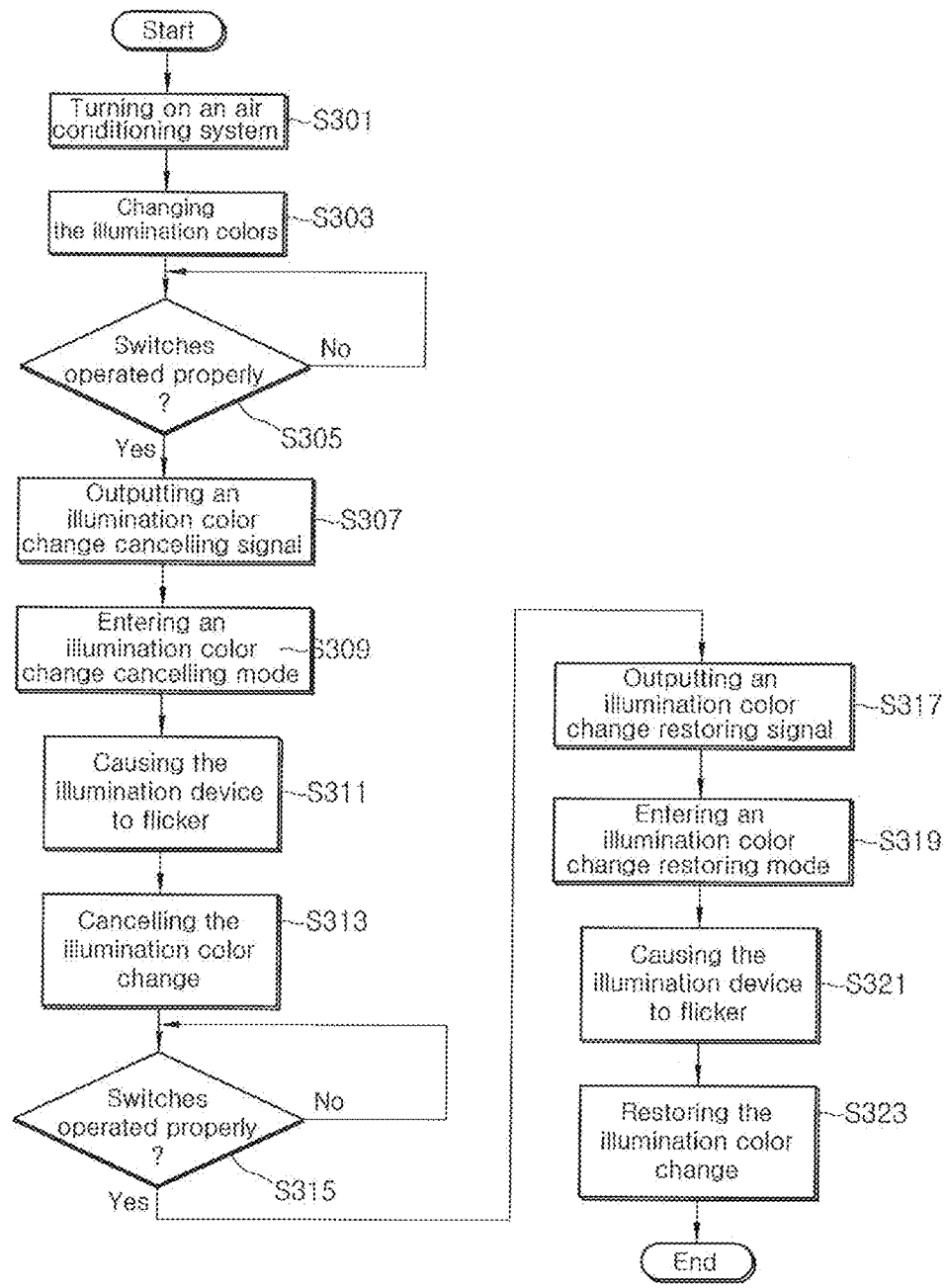
FIG. 14 is a flowchart showing an operation example of the air conditioning system controller according to the third embodiment.

Referring to FIGS. 13 and 14, the air conditioning system is turned on (S301). The illumination color of a specific illumination device, e.g., the illumination color of the mood lamp 4, is differently changed (S303). In this state, the control unit 30 determines whether the respective switches 3-2 and 3-3 of the illumination color change cancelling/restoring mode entry unit 40 are operated in conformity with a predetermined cancelling condition (S305). For example, the control unit 30 determines whether the mode selection switch 3-3 is fast pushed four times or more within two seconds while the auto-mode switch 3-2 is kept pushed.

If it is determined that the mode selection switch 3-3 is fast pushed four times or more within two seconds while the auto-mode switch 3-2 is kept pushed, the illumination color change cancelling/restoring mode entry unit 40 outputs an illumination color change cancelling mode entry signal S1 (S307).

If the illumination color change cancelling mode entry signal S1 is output, the control unit 30 determines that a user does not wish to change the illumination color of the illumination device. Thus, the control unit 30 enters an illumination color change cancelling mode 37 (S309).

In the illumination color change cancelling mode 37, the control unit 30 causes the light sources 4*d* of the illumination device to flicker a predetermined number of times at a predetermined time interval (S311) and then cancels the change of the illumination color of the illumination device (S313). For example, the control unit 30 causes the light sources 4*d* of the illumination device to flicker three times at an interval of 0.5 second (S311) and then cancels the change of the illumination color of the illumination device (S313).

Thus, the change of the illumination color of the illumination device is stopped and the illumination color of the illumination device is controlled to become one specific color.

Next, description will be made on an operation of restoring the change of the illumination color of the illumination device.

Referring to FIGS. 13 and 14, the control unit 30 determines whether the respective switches 3-2 and 3-3 of the illumination color change cancelling/restoring mode entry unit 40 are operated in conformity with a predetermined restoring condition while the change of the illumination color of the illumination device remains cancelled (S315). For example, the control unit 30 determines whether the mode selection switch 3-3 is fast pushed four times or more within two seconds while the auto-mode switch 3-2 is kept pushed.

If it is determined that the mode selection switch 3-3 is fast pushed four times or more within two seconds while the auto-mode switch 3-2 is kept pushed, the illumination color change cancelling/restoring mode entry unit 40 outputs an illumination color change restoring mode entry signal S2 (S317).

If the illumination color change restoring mode entry signal S2 is output, the control unit 30 determines that a user wishes to change the illumination color of the illumination device. Thus, the control unit 30 enters an illumination color change restoring mode 38 (S319).

In the illumination color change restoring mode 38, the control unit 30 causes the light sources 4*d* of the illumination device to flicker a predetermined number of times at a predetermined time interval (S321) and then restores the change of the illumination color of the illumination device (S323). For example, the control unit 30 causes the light sources 4d of the illumination device to flicker three times at an interval of 0.5 second (S321) and then restores the change of the illumination color of the illumination device (S323).

As a result, the change of the illumination color of the illumination device is restarted and the illumination color of the mood lamp 4 is differently changed depending on specific conditions.

The air conditioning system controller of the third embodiment configured as above has a configuration capable of restraining the change of the illumination colors of the illumination devices if such a need arises. It is therefore possible to cancel the change of the illumination colors of the illumination devices in case where a user does not wish to change the illumination colors.

Since the air conditioning system controller is capable of cancelling the change of the illumination colors of the illumination devices in case where a user does not wish to change the illumination colors, it is possible to relieve the shortcomings attributable to the change of the illumination colors, e.g., the visual stimulus given to a driver and the resultant hindrance of safe driving.

While certain preferred embodiments of the invention have been described above, the present invention is not limited to these embodiments. It is to be understood that various changes and modifications may be made without departing from the scope of the invention defined in the claims.

What is claimed is:

1. An air conditioning system controller for a motor vehicle, comprising:
   a mood lamp;
   an illumination device illuminating the mood lamp with at least one variable illumination color;
   a control unit in signal communication with the illumination device and configured to control the at least one variable illumination color of the illumination device responsive to at least one of a cooling/heating load of an air conditioning system of the motor vehicle, an external air temperature condition of the air conditioning system of the motor vehicle, and a vehicle room temperature set by a user of the motor vehicle, wherein the external air temperature condition is one of a cooling condition, a heating condition, and a heating/cooling mixed condition;
   a cooling/heating load detecting unit in signal communication with the control unit and configured to detect the cooling/heating load and signal the cooling/heating load to the control unit, the cooling/heating load detecting unit including a blower rotation speed level detecting unit configured to detect a blower rotation speed level of a blower of the air conditioning system of the motor vehicle, wherein the cooling/heating load is dependent on the blower rotation speed level; and
   an external air temperature condition detecting unit in signal communication with the control unit and configured to detect the external air temperature condition of the air conditioning system and signal the external air temperature condition to the control unit.

2. The air conditioning system controller of claim 1, further comprising a front surface portion, wherein the mood lamp includes a ring-type mood lamp disposed on the front surface portion around a rotary switch and a bar-type mood lamp disposed on the front surface portion, wherein each of the ring-type mood lamp and the bar-type mood lamp is illuminated with the at least one variable illumination color.

3. The air conditioning system controller of claim 1, further comprising an illumination color change cancelling/restoring mode entry unit in signal communication with the control unit and including at least a pair of button-type switches disposed on the air conditioning system controller, wherein the illumination color change cancelling/restoring mode entry unit is configured to allow the control unit to one of cancel a change of the at least one variable illumination color and restore the change of the at least one variable illumination color in response to operation of one of the switches.

4. The air conditioning system controller of claim 1, wherein the at least one variable illumination color is one of:
   when the external air temperature condition of the air conditioning system is the cooling condition, one of a white color if the blower rotation speed level is one of less than and equal to a cooling reference level and a cold color if the blower rotation speed level is greater than the cooling reference level;
   when the external air temperature condition of the air conditioning system is the heating condition, one of a white color if the blower rotation speed level is one of less than and equal to a heating reference level and a warm color if the blower rotation speed level is greater than the heating reference level; and
   when the external air temperature condition of the air conditioning system is the heating/cooling mixed condition, a white color.

5. The air conditioning system controller of claim 4, wherein the at least one variable illumination color of the illumination device is one of the cold color and the warm color, wherein a chroma of the one of the cold color and the warm color gradually increases with an increase of the blower rotation speed level under control of the control unit.

6. The air conditioning system controller of claim 4, wherein the cold color is a blue-based color.

7. The air conditioning system controller of claim 4, wherein the warm color is a yellow-based color.

8. The air conditioning system controller of claim 1, wherein the illumination device includes a plurality of light sources illuminating the mood lamp with a plurality of variable illumination colors, each of the plurality of light sources disposed along a rear surface of the mood lamp at a predetermined interval and configured to illuminate a region of the mood lamp.

9. The air conditioning system controller of claim 8, wherein each of the plurality of variable illumination colors is one of:
   when the external air temperature condition of the air conditioning system is the cooling condition, one of a white color if the blower rotation speed level is one of less than or equal to a cooling reference level and a blue-based color having a chroma varying from a chroma of each of the other plurality of variable illumination colors if the blower rotation speed level is greater than the cooling reference level;
   when the external air temperature condition of the air conditioning system is the heating condition, one of a white color if the blower rotation speed level is one of less than or equal to a heating reference level and a yellow-based color having a chroma varying from a chroma of each of the other plurality of variable illumination colors if the blower rotation speed level is greater than the heating reference level; and when the external air temperature condition of the air conditioning system is the heating/cooling mixed condition, a white color.

10. The air conditioning system controller of claim 9, wherein each of the plurality of variable illumination colors is one of the blue-based color and the yellow-based color and is arranged in an order of gradually increasing chroma.

11. The air conditioning system controller of claim 10, wherein each of the plurality of variable illumination colors sequentially shift in one direction along each of the regions of the mood lamp illuminated by each of the light sources at a predetermined time interval.

12. A method of controlling illumination colors of an air conditioning controller of a motor vehicle comprising the steps of:
providing an air conditioning system controller including a mood lamp and an illumination device illuminating the mood lamp with at least one variable illumination color;
providing a control unit in signal communication with the illumination device;
controlling the at least one variable illumination color of the illumination device responsive to at least one of a cooling/heating load of an air conditioning system of the motor vehicle, an external air temperature condition of the air conditioning system of the motor vehicle, and a vehicle room temperature set by a user of the motor vehicle with the control unit;
detecting the external air temperature condition of the air conditioning system with an external air temperature condition detecting unit, the external air temperature condition is one of a cooling condition, a heating condition, and a heating/cooling mixed condition;
communicating the external air temperature condition to the control unit;
detecting a blower rotation speed level of a blower of the air conditioning system with a blower rotation speed level detecting unit; and
calculating the cooling/heating load based on the blower rotation speed level with a cooling/heating load detecting unit.

13. The method of claim 12, further comprising the steps of:
if the cooling condition is detected, changing the at least one variable illumination color with the control unit to one of a white color if the blower rotation speed level is one of less than and equal to a cooling reference level and a cold color if the blower rotation speed level is greater than the cooling reference level;
if the heating condition is detected, changing the at least one variable illumination color with the control unit to one of a white color if the blower rotation speed level is one of less than and equal to a heating reference level and a cold color if the blower rotation speed level is greater than the heating reference level; and
if the heating/cooling mixed condition is detected, changing the illumination color with the control unit to a white color.

14. The method of claim 12, further comprising the steps of:
providing an illumination color change cancelling/restoring mode entry unit in signal communication with the control unit;
cancelling the control of the at least one variable illumination color with the control unit based on a signal received from the illumination color change cancelling/restoring mode entry;
restoring the control of the at least one variable illumination color with the control unit based on a signal from the illumination color change cancelling/restoring mode entry unit; and
causing the illumination device to flicker a predetermined number of times with the control unit if the signal from the illumination color change cancelling/restoring mode entry unit is received.

15. The method of claim 12, further comprising the steps of:
disposing a plurality of light sources along a rear surface of the air conditioning system controller, the plurality of light sources configured to illuminate the mood lamp with a plurality of variable illumination colors;
if the cooling condition is detected, changing each of the plurality of variable illumination colors with the control unit to one of a white color if the blower rotation speed level is one of less than or equal to a cooling reference level and a blue-based color having a chroma varying from a chroma of each of the other plurality of variable illumination colors if the blower rotation speed level is greater than the cooling reference level;
if the heating condition is detected, changing each of the plurality of variable illumination colors with the control unit to one of a white color if the blower rotation speed level is one of less than or equal to a heating reference level and a yellow-based color having a chroma varying from a chroma of each of the other plurality of variable illumination colors if the blower rotation speed level is greater than the heating reference level; and
if the heating/cooling mixed condition is detected, changing each of the plurality of variable illumination with the control unit colors to a white color.

16. The method of claim 15, further comprising the steps of:
sequentially shifting each of the plurality of variable illumination colors in one direction along each of the regions of the mood lamp illuminated by each of the light sources at a predetermined time interval with the control unit.

17. A method of controlling illumination colors of an air conditioning controller of a motor vehicle comprising the steps of:
providing an air conditioning system controller including a mood lamp and an illumination device illuminating the mood lamp with at least one variable illumination color;
providing a control unit in signal communication with the illumination device;
controlling the at least one variable illumination color of the illumination device responsive to at least one of a cooling/heating load of an air conditioning system of the motor vehicle, an external air temperature condition of the air conditioning system of the motor vehicle, and a vehicle room temperature set by a user of the motor vehicle with the control unit;
detecting the external air temperature condition of the air conditioning system with an external air temperature condition detecting unit, the external air temperature condition is one of a cooling condition, a heating condition, and a heating/cooling mixed condition;
communicating the external air temperature condition to the control unit;
detecting a blower rotation speed level of a blower of the air conditioning system with a blower rotation speed level detecting unit;

calculating the cooling/heating load based on the blower rotation speed level with a cooling/heating load detecting unit;

changing the at least one variable illumination color with the control unit to one of a white color and a cold color if the cooling condition is detected;

changing the at least one variable illumination color with the control unit to one of a white color and a warm color if the heating condition is detected; and changing the at least one variable illumination color with the control unit to a white color if the heating/cooling condition is detected.

* * * * *